United States Patent
Zhong et al.

(10) Patent No.: US 12,387,009 B2
(45) Date of Patent: Aug. 12, 2025

(54) APPLICATION PERMISSION MANAGEMENT METHOD AND APPARATUS, AND ELECTRONIC DEVICE

(71) Applicant: Huawei Technologies Co., Ltd., Shenzhen (CN)

(72) Inventors: Jianfei Zhong, Hangzhou (CN); Zebin Zhou, Hangzhou (CN); Bo Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 18/002,166

(22) PCT Filed: Apr. 22, 2021

(86) PCT No.: PCT/CN2021/088975
§ 371 (c)(1),
(2) Date: Dec. 16, 2022

(87) PCT Pub. No.: WO2021/253975
PCT Pub. Date: Dec. 23, 2021

(65) Prior Publication Data
US 2023/0351048 A1    Nov. 2, 2023

(30) Foreign Application Priority Data
Jun. 18, 2020   (CN) .......................... 202010559655.8

(51) Int. Cl.
*H04L 29/06*       (2006.01)
*G06F 21/44*       (2013.01)
*G06F 21/62*       (2013.01)

(52) U.S. Cl.
CPC .......... *G06F 21/6281* (2013.01); *G06F 21/44* (2013.01)

(58) Field of Classification Search
CPC ............................ G06F 21/6281; G06F 21/44
See application file for complete search history.

(56) References Cited

U.S. PATENT DOCUMENTS

| | | | |
|---|---|---|---|
| 2012/0030119 A1* | 2/2012 | Little | G06Q 20/40 715/764 |
| 2019/0068612 A1* | 2/2019 | Eads | H04L 63/105 |
| 2021/0084048 A1* | 3/2021 | Kannan | H04L 63/104 |

FOREIGN PATENT DOCUMENTS

| | | |
|---|---|---|
| CN | 100583118 C | 1/2010 |
| CN | 103514397 A | 1/2014 |
| CN | 105320882 A | 2/2016 |
| CN | 108600793 A | 9/2018 |

(Continued)

OTHER PUBLICATIONS

Machine translation for cn108664786A (Year: 2018).*

*Primary Examiner* — Jason K Gee
(74) *Attorney, Agent, or Firm* — Slater Matsil, LLP

(57) ABSTRACT

An application permission management method, device, and medium. The method includes obtaining, by an electronic device, operation information of starting, by a user, a first application installed in the electronic device, sending a permission query request for the first application to a server, where the permission query request includes an identifier of the first application, receiving a permission authorization record of the first application sent by the server, and configuring permission of the first application on the electronic device based on the permission authorization record.

20 Claims, 27 Drawing Sheets

(56) References Cited

FOREIGN PATENT DOCUMENTS

| | | | | |
|---|---|---|---|---|
| CN | 108664786 A | * | 10/2018 | ............. G06F 21/44 |
| CN | 109714350 A | | 5/2019 | |
| CN | 109740307 A | | 5/2019 | |
| CN | 109995709 A | | 7/2019 | |
| WO | 2019144928 A1 | | 8/2019 | |

* cited by examiner

APPLICATION PERMISSION MANAGEMENT METHOD AND APPARATUS, AND ELECTRONIC DEVICE

CROSS-REFERENCE TO RELATED APPLICATIONS

This application is a national stage of International Application No. PCT/CN2021/088975, filed on Apr. 22, 2021, which claims priority to Chinese Patent Application No. 202010559655.8, filed on Jun. 18, 2020. Both of the aforementioned applications are hereby incorporated by reference in their entireties.

TECHNICAL FIELD

Embodiments of this application relate to the field of intelligent terminal technologies, and in particular, to an application permission management method and apparatus, and an electronic device.

BACKGROUND

Currently, functions and types of intelligent electronic devices are increasingly diversified, and there are more scenarios in which a same application is installed on different electronic devices. To ensure security as much as possible, a dynamic authorization mechanism is generally used for a permission management service of an electronic device. The dynamic authorization mechanism is a mechanism in which when an application (application, APP) is installed, common permission that does not cause a major risk to user privacy or running of an electronic device is automatically authorized by using a permission management service, and for sensitive permission that has potential impact on user privacy or running of the electronic device, a dialog box is displayed for the user to confirm authorization when the APP needs to use the permission.

Although the dynamic authorization mechanism simplifies the authorization of common permission, sensitive permission still needs to be manually authorized. In a scenario in which a same application is installed on a plurality of devices, the user needs to repeatedly confirm authorization. For the user, such an operation is cumbersome, which leads to poor user experience.

SUMMARY

Embodiments of this application provide an application permission management method and apparatus, and an electronic device, and embodiments of this application further provide a computer-readable storage medium, to simplify permission confirmation operations of installing a same application on different distributed devices for a plurality of times, and reduce complex operations of popping up a dialog box for a user to confirm, thereby improving user experience.

According to a first aspect, this application provides an application permission management method, including: An electronic device obtains operation information for starting a first application installed on the electronic device by a user, sends a permission query request for the first application to a server, where the permission query request includes an identifier of the first application, receives a permission authorization record of the first application that is sent by the server, and configures permission of the first application on the electronic device based on the permission authorization record.

In the application permission management method, after obtaining the operation information for starting the first application installed on the electronic device by the user, the electronic device sends the permission query request for the first application to the server, and then the electronic device receives the permission authorization record of the first APP sent by the server. The permission of the first application on the electronic device is configured based on the permission authorization record, so that a permission confirmation operation of installing a same application on different distributed devices for a plurality of times can be simplified. In this way, complex operations of popping up a dialog box for a user to confirm are reduced, and user experience is improved.

In a possible implementation, after sending the permission query request for the first application to the server, the electronic device may further receive a notification that is sent by the server and that indicates that no permission authorization record of the first application is found. Then, the electronic device obtains a distributed authorization mode of a user account logged in to the electronic device, and displays a permission confirmation interface to the user based on the distributed authorization mode.

In a possible implementation, that the permission confirmation interface is displayed to the user based on the distributed authorization mode may be as follows: When the distributed authorization mode is single-device authorization or all-device authorization, or when the distributed authorization mode is device group authorization and the electronic device has joined a device group, a first permission confirmation interface is displayed to the user. When the distributed authorization mode is device group authorization and the electronic device has not joined a device group, a second permission confirmation interface is displayed to the user, where the second permission confirmation interface includes information of selecting a device group for the electronic device to join.

In a possible implementation, after displaying the first permission confirmation interface to the user, the electronic device may further obtain permission confirmation information of the first application from the first permission confirmation interface, send the permission confirmation information of the first application to the server, and configure the permission of the first application on the electronic device based on the permission confirmation information of the first application.

In a possible implementation, after displaying the second permission confirmation interface to the user, the electronic device may further obtain permission confirmation information of the first application and information about a device group selected by the user for the electronic device from the second permission confirmation interface. Then, the electronic device sends the permission confirmation information of the first application and the information about the device group selected by the user for the electronic device to the server. Finally, the electronic device configures the permission of the first application on the electronic device based on the permission confirmation information of the first application.

In a possible implementation, before obtaining the operation information of starting the first application installed on the electronic device by the user, the electronic device may further send a notification indicating that the first application is installed to the server after the first application is installed on the electronic device.

In a possible implementation, after the first application is uninstalled from the electronic device, the electronic device may further send, to the server, a notification indicating that the first application is uninstalled.

In a possible implementation, after the user account is logged in to the electronic device for the first time, the electronic device may display an account permission management interface to the user. Then, the electronic device obtains a permission authorization mode selected by the user on the account permission management interface. If the permission authorization mode selected by the user is distributed authorization, the electronic device displays a distributed authorization mode interface to the user. The distributed authorization mode includes single-device authorization, device group authorization, and all-device authorization. Next, the electronic device may obtain a distributed authorization mode selected by the user, and sends the distributed authorization mode selected by the user to the server.

In a possible implementation, after the user account is logged out from the electronic device, and the user account is re-logged in to the electronic device, the electronic device may further receive a notification that is sent by the server and that is of displaying a permission application interface to the user. The permission application interface is displayed to the user, and information about whether to use application permission corresponding to the user account is displayed in the permission application interface. Then, the electronic device obtains information indicating that the user determines to use the application permission corresponding to the user account, and sends, to the server, the information indicating that the user determines to use the application permission corresponding to the user account.

In a possible implementation, after the user account is logged in to the electronic device, the electronic device may further receive a notification that is sent by the server and that is of displaying a permission synchronization interface. Then, the electronic device obtains a distributed authorization mode of the user account logged in to the electronic device. When the distributed authorization mode of the user account is all-device authorization, or when the distributed authorization mode is device group authorization and the electronic device has joined a device group, a first permission synchronization interface is displayed to the user, and information about whether to synchronize application permission is displayed in the first permission synchronization interface. Next, the electronic device obtains information indicating that the user determines to perform application permission synchronization, sends the information indicating that the user determines to perform application permission synchronization to the server, receives a permission authorization record of the first application sent by the server, and configures the permission of the first application on the electronic device based on the permission authorization record.

In a possible implementation, after the electronic device obtains the distributed authorization mode of the user account logged in to the electronic device, when the distributed authorization mode of the user account is device group authorization, and the electronic device has not joined a device group, the electronic device displays a second permission synchronization interface to the user, and displays, in the second permission synchronization interface, information about whether to synchronize application permission and information of selecting a device group for the electronic device to join. Then, the electronic device obtains information indicating that the user determines to perform application permission synchronization and information about a device group selected by the user for the electronic device, and sends, to the server, the information indicating that the user determines to perform application permission synchronization and the information about the device group selected by the user for the electronic device. The electronic device receives a permission authorization record of the first application that is sent by the server, and configures the permission of the first application on the electronic device based on the permission authorization record.

In a possible implementation, after the user account is logged in to the electronic device, the electronic device may further obtain operation information of modifying permission configuration of the first application by the user, obtain the distributed authorization mode of the user account from the server, display a permission modification interface to the user based on the distributed authorization mode of the user account, and finally, obtain permission configuration modified by the user on the permission modification interface, and send the modified permission configuration to the server.

According to a second aspect, an embodiment of this application provides an application permission management method, including: A server receives a permission query request that is for a first application and that is sent by an electronic device, where the permission query request is sent by the electronic device after the electronic device obtains operation information of starting the first application by a user, and the permission query request carries an identifier of the first application. Then, the server queries, based on the identifier of the first application, a permission authorization record of the first application in a permission policy table corresponding to a user account currently logged in to the electronic device. If the permission authorization record of the first application is found, the permission authorization record of the first application is sent to the electronic device, so that the electronic device configures permission of the first application on the electronic device based on the permission authorization record.

In the foregoing application permission management method, after obtaining operation information of starting the first application by the user, the electronic device sends the permission query request for the first application to the server. If the server finds the permission authorization record of the first application in the permission policy table corresponding to the user account currently logged in to the electronic device, the server sends the permission authorization record of the first application to the electronic device, so that the electronic device can configure the permission of the first application on the electronic device based on the received permission authorization record. In this way, permission confirmation operations of installing a same application on different distributed devices for a plurality of times are simplified, and complex operations of popping up a dialog box for a user to confirm are reduced, thereby improving user experience.

In a possible implementation, that the server queries, based on the identifier of the first application, the permission authorization record of the first application in the permission policy table corresponding to the user account currently logged in to the electronic device may be as follows: A distributed authorization mode of the user account is obtained. If the distributed authorization mode of the user account is single-device authorization, the permission authorization record of the first application is queried in a single-device application permission policy table corresponding to the user account. If the distributed authorization mode of the user account is device group authorization, query is performed in the single-device application permission policy table corresponding to the user account. If in the single-device application permission policy table, a permission policy of the first application is follow, a device group to which the electronic device belongs is obtained, and the permission authorization record of the first application is queried in a device group application permission policy table corresponding to the user account. If the distributed authorization mode of the user account is all-device authorization, query is performed in the single-device application permission policy table corresponding to the user account. If the permission policy of the first application is follow in the single-device application permission policy table, and a status of the electronic device in a login device table corresponding to the user account is login, the permission authorization record of the first application is queried in an all-device application permission policy table corresponding to the user account.

In a possible implementation, after querying the permission authorization record of the first application, if the permission policy table corresponding to the user account does not include the permission authorization record of the first application, the server sends, to the electronic device, a notification indicating that no permission authorization record of the first application is found, and receives permission confirmation information of the first application that is sent by the electronic device. Then, the server stores the permission confirmation information of the first application in the permission policy table corresponding to the user account.

In a possible implementation, that the server stores the permission confirmation information of the first application in the permission policy table corresponding to the user account may be as follows: If the distributed authorization mode of the user account is single-device authorization, an entry of the electronic device is added to the single-device application permission policy table corresponding to the user account, and a permission authorization record of the first application is added to the added entry.

If the distributed authorization mode of the user account is device group authorization, and the electronic device has joined a device group, a device group to which the electronic device belongs is obtained, an entry of the electronic device is added to the single-device application permission policy table corresponding to the user account, and in the added entry, the permission policy of the first application is set to follow (follow). A permission authorization record of the first application is added to an entry corresponding to the device group in a device group application permission policy table corresponding to the user account.

If the distributed authorization mode of the user account is all-device authorization, an electronic device to which the user account is logged in is obtained from the login device table corresponding to the user account. An entry of the electronic device to which the user account is logged in is added to the single-device application permission policy table corresponding to the user account. In the added entry, the permission policy of the first application is set to follow, and a permission authorization record of the first application is added to the all-device application permission policy table corresponding to the user account.

In a possible implementation, after sending, to the electronic device, the notification indicating that no permission authorization record of the first application is found, the server may further receive information about a device group selected by the user for the electronic device. That the server stores the permission confirmation information of the first application in the permission policy table corresponding to the user account may be as follows:

If the distributed authorization mode of the user account is device group authorization, and the electronic device has not joined a device group, the server adds an entry corresponding to the electronic device to a device group member table corresponding to the user account, and records, in the added entry, a correspondence between the electronic device and the device group selected by the user. An entry of the electronic device is added to the single-device application permission policy table corresponding to the user account, and in the added entry, the permission policy of the first application is set to follow. In the device group application permission policy table corresponding to the user account, a permission authorization record of the first application is added to an entry corresponding to the device group selected by the user.

In a possible implementation, before receiving the permission query request that is for the first application and that is sent by the electronic device, the server may further receive a notification that indicates that the first application is installed and that is sent by the electronic device. Entries corresponding to the electronic device and the first application are added to an application installation table corresponding to the user account currently logged in to the electronic device, and an event that the first application is installed on the electronic device is recorded in the foregoing entries.

In a possible implementation, the server may further receive a notification that indicates that the first application is uninstalled and that is sent by the electronic device. The entries corresponding to the electronic device and the first application are deleted from the application installation table corresponding to the user account. If the application installation table corresponding to the user account shows that the first application is not installed on the electronic device, an entry corresponding to the first application is deleted from the permission policy table corresponding to the user account. The permission policy table corresponding to the user account includes the single-device application permission policy table, the device group application permission policy table, and the all-device application permission policy table.

In a possible implementation, the server may further receive a distributed authorization mode sent by the electronic device. The distributed authorization mode is a distributed authorization mode selected by the user and obtained after the user account is logged in to the electronic device for the first time. The distributed authorization mode includes single-device authorization, device group authorization, and all-device authorization. The distributed authorization mode is recorded in a distributed application authorization mode table corresponding to the user account.

In possible implementation, the server may further obtain an event that the user account is successfully logged in to another electronic device other than the electronic device, and notify the another electronic device to display a permission synchronization interface to a user who uses the another electronic device. Then, the server receives information that is sent by the another electronic device and that indicates that the user who uses the another electronic device confirms application permission synchronization, and sends a permission authorization record of the first application to the another electronic device. An entry corresponding to the another electronic device is added to the login device table corresponding to the user account, and an event that the user account is logged in to the another electronic device is recorded in the added entry.

In a possible implementation, after notifying the another electronic device to display the permission synchronization interface to the user who uses the another electronic device, the server further receives information that is sent by the another electronic device and that is of a device group selected by the user for the another electronic device, and sends the permission authorization record of the first application to the another electronic device. An entry corresponding to the another electronic device is added to the login device table corresponding to the user account, and an event recording that the user account is logged in to the electronic device is added to the added entry. In addition, an entry corresponding to the another electronic device is added to the device group member table corresponding to the user account. In the added entry, a correspondence between the another electronic device and the device group to which the another electronic device belongs is recorded.

In a possible implementation, after the electronic device starts the first application, the server may further obtain an event that the user account is logged out from the electronic device, and updates, in the login device table corresponding to the user account, the status of the electronic device to logout.

In a possible implementation, after updating, in the login device table corresponding to the user account, the status of the electronic device to logout, the server may further obtain an event that the user account is re-logged in to the electronic device, and notifies the electronic device to display a permission application interface to the user, where the permission application interface displays information about whether to use application permission corresponding to the user account.

Then, the server receives information that is sent by the electronic device and that indicates that the user determines to use the application permission corresponding to the user account, and updates, in the login device table corresponding to the user account, the status of the electronic device to login.

According to a third aspect, an embodiment of this application provides an application permission management apparatus. The apparatus is included in an electronic device, and the apparatus has a function of implementing behavior of the electronic device in the first aspect and the possible implementations of the first aspect. The function may be implemented by hardware, or may be implemented by executing corresponding software by hardware. The hardware or the software includes one or more modules or units corresponding to the foregoing function, for example, a receiving module or unit, a processing module or unit, and a sending module or unit.

According to a fourth aspect, an embodiment of this application provides an application permission management apparatus. The apparatus is included in a server, and the apparatus has a function of implementing behavior of the server in the second aspect and the possible implementations of the second aspect. The function may be implemented by hardware, or may be implemented by executing corresponding software by hardware. The hardware or the software includes one or more modules or units corresponding to the foregoing function, for example, a receiving module or unit, a processing module or unit, and a sending module or unit.

According to a fifth aspect, an embodiment of this application provides an electronic device, including one or more processors, a memory, a plurality of applications, and one or more computer programs. The one or more computer programs are stored in the memory, the one or more computer programs include instructions, and when the instructions are executed by the electronic device, the electronic device is enabled to perform the following steps: Operation information for starting, by a user, a first application installed in the electronic device is obtained. A permission query request for the first application is sent to a server, where the permission query request carries an identifier of the first application. A permission authorization record of the first application that is sent by the server is received. Permission of the first application on the electronic device is configured based on the permission authorization record.

In a possible implementation, when the instructions are executed by the electronic device, after performing the step of sending the permission query request for the first application to the server, the electronic device further performs the following steps: A notification that is sent by the server and that indicates that no permission authorization record of the first application is found is received. A distributed authorization mode of a user account logged in to the electronic device is obtained. Based on the distributed authorization mode, a permission confirmation interface is displayed to the user.

In a possible implementation, when the instructions are executed by the electronic device, the step that the electronic device is enabled to display the permission confirmation interface to the user based on the distributed authorization mode may be as follows: When the distributed authorization mode is single-device authorization or all-device authorization, or when the distributed authorization mode is device group authorization and the electronic device has joined a device group, a first permission confirmation interface is displayed to the user. When the distributed authorization mode is device group authorization and the electronic device has not joined a device group, a second permission confirmation interface is displayed to the user, where the second permission confirmation interface includes information of selecting a device group for the electronic device to join.

In a possible implementation, when the instructions are executed by the electronic device, after the electronic device is enabled to perform the step of displaying the first permission confirmation interface to the user, the electronic device further performs the following steps: Permission confirmation information of the first application is obtained from the first permission confirmation interface. The permission confirmation information of the first application is sent to the server. The permission of the first application on the electronic device is configured based on the permission confirmation information of the first application.

In a possible implementation, when the instructions are executed by the electronic device, after the electronic device is enabled to perform the step of displaying the second permission confirmation interface to the user, the electronic device further performs the following steps: Permission confirmation information of the first application and information about a device group selected by the user for the electronic device are obtained from the second permission confirmation interface. The permission confirmation information of the first application and the information about the device group selected by the user for the electronic device are sent to the server. The permission of the first application on the electronic device is configured based on the permission confirmation information of the first application.

In a possible implementation, when the instructions are executed by the electronic device, before the electronic device is enabled to perform the step of obtaining the operation information of starting the first application installed on the electronic device by the user, the electronic device further performs the following step: A notification indicating that the first application is installed is sent to the server after the first application is installed on the electronic device.

In a possible implementation, when the instructions are executed by the electronic device, the electronic device is further enabled to perform the following step: A notification indicating that the first application is uninstalled is sent to the server after the first application is uninstalled from the electronic device.

In a possible implementation, when the instructions are executed by the electronic device, the electronic device is further enabled to perform the following steps: After the user account is logged in to the electronic device for the first time, an account permission management interface is displayed to the user. Then, a permission authorization mode selected by the user on the account permission management interface is obtained. If the permission authorization mode selected by the user is distributed authorization, a distributed authorization mode interface is further displayed to the user. The distributed authorization mode includes single-device authorization, device group authorization, and all-device authorization. A distributed authorization mode selected by the user is obtained, and the distributed authorization mode selected by the user is sent to the server.

In another possible implementation, when the instructions are executed by the electronic device, the electronic device is further enabled to perform the following steps: After the user account is logged out from the electronic device and the user account is re-logged in to the electronic device, a notification that is sent by the server and that is of displaying a permission application interface to the user is received. The permission application interface is displayed to the user, and information about whether to use application permission corresponding to the user account is displayed in the permission application interface. Information indicating that the user determines to use the application permission corresponding to the user account is obtained, and the information indicating that the user determines to use the application permission corresponding to the user account is sent to the server.

In a possible implementation, when the instructions are executed by the electronic device, the electronic device is further enabled to perform the following steps: After the user account is logged in to the electronic device, a notification that is sent by the server and that is of displaying a permission synchronization interface. Then, a distributed authorization mode of the user account logged in to the electronic device is obtained. When the distributed authorization mode of the user account is all-device authorization, or the distributed authorization mode is device group authorization and the electronic device has joined a device group, a first permission synchronization interface is displayed to the user, and information about whether to synchronize application permission is displayed in the first permission synchronization interface. Then, information indicating that the user determines to perform application permission synchronization is obtained, and the information indicating that the user determines to perform application permission synchronization is sent to the server. A permission authorization record of the first application sent by the server is obtained. The permission of the first application on the electronic device is configured based on the permission authorization record.

In a possible implementation, when the instructions are executed by the electronic device, after the electronic device is enabled to perform the step of obtaining the distributed authorization mode of the user account logged in to the electronic device, the electronic device further performs the following steps: When the distributed authorization mode of the user account is device group authorization, and the electronic device has not joined a device group, a second permission synchronization interface is displayed to the user, and information about whether to synchronize application permission and information of selecting a device group for the electronic device to join is displayed in the second permission synchronization interface. Information indicating that the user determines to perform application permission synchronization and information about a device group selected by the user for the electronic device are obtained. The information indicating that the user determines to perform application permission synchronization and the information about the device group selected by the user for the electronic device are sent to the server. A permission authorization record of the first application that is sent by the server is received, and the permission of the first application is configured based on the permission authorization record.

In a possible implementation, when the instructions are executed by the electronic device, the electronic device is further enabled to perform the following steps: After the user account is logged in to the electronic device, operation information of modifying permission configuration of the first application by the user is obtained. A distributed authorization mode of the user account is obtained from the server. A permission modification interface is displayed to the user based on the distributed authorization mode of the user account. Permission configuration modified by the user on the permission modification interface is obtained, and modified target permission is sent to the server.

According to a sixth aspect, an embodiment of this application provides a server, including one or more processors, a memory, a plurality of applications, and one or more computer programs. The one or more computer programs are stored in the memory, the one or more computer programs include instructions, and when the instructions are executed by the server, the server is enabled to perform the following steps: Permission query request for a first application that is sent by an electronic device is received, where the permission query request is sent after the electronic device obtains operation information of starting the first application by a user, and the permission query request carries an identifier of the first application. A permission authorization record that is of the first application is queried based on the identifier of the first application and in a permission policy table corresponding to a user account currently logged in to the electronic device. If a permission authorization record of the first application is found, the permission authorization record of the first application is sent to the electronic device, so that the electronic device configures the permission of the first application on the electronic device based on the permission authorization record.

In a possible implementation, that when the instructions are executed by the server, the server is enabled to perform the step of querying, based on the identifier of the first application, the permission authorization record of the first application in the permission policy table corresponding to the user account currently logged in to the electronic device includes: A distributed authorization mode of the user account is obtained. If the distributed authorization mode of the user account is single-device authorization, the permission authorization record of the first application is queried in a single-device application permission policy table corresponding to the user account. If the distributed authorization mode of the user account is device group authorization, query is performed in the single-device application permission policy table corresponding to the user account. If in the single-device application permission policy table, a permission policy of the first application is follow, a device group to which the electronic device belongs is obtained, and the permission authorization record of the first application is queried in a device group application permission policy table corresponding to the user account. If the distributed authorization mode of the user account is all-device authorization, query is performed in the single-device application permission policy table corresponding to the user account. If the permission policy of the first application is follow in the single-device application permission policy table, and a status of the electronic device in a login device table corresponding to the user account is login, the permission authorization record of the first application is queried in an all-device application permission policy table corresponding to the user account.

In a possible implementation, when the instructions are executed by the server, after the server is enabled to perform the step of querying the permission authorization record of the first application, the server further performs the following steps: If the permission policy table corresponding to the user account does not include the permission authorization record of the first application, a notification indicating that no permission authorization record of the first application is found is sent to the electronic device. Permission confirmation information of the first application that is sent by the electronic device is received. The permission confirmation information of the first application is stored in the permission policy table corresponding to the user account.

In a possible implementation, when the instructions are executed by the server, that the server performs the step of storing the permission confirmation information of the first application in the permission policy table corresponding to the user account includes: If the distributed authorization mode of the user account is single-device authorization, an entry of the electronic device is added to a single-device application permission policy table corresponding to the user account, and a permission authorization record of the first application is added to the added entry. If the distributed authorization mode of the user account is device group authorization, and the electronic device has joined a device group, a device group to which the electronic device belongs is obtained. An entry of the electronic device is added to the single-device application permission policy table corresponding to the user account, and in the added entry, a permission policy of the first application is set to follow, and a permission authorization record of the first application is added to an entry corresponding to the device group in a device group application permission policy table corresponding to the user account. If the distributed authorization mode of the user account is all-device authorization, an electronic device to which the user account is logged in is obtained from a login device table corresponding to the user account, and an entry of the electronic device to which the user account is logged in is added to the single-device application permission policy table corresponding to the user account. In the added entry, the permission policy of the first application is set to follow, and a permission authorization record of the first application is added to an all-device application permission policy table corresponding to the user account.

In a possible implementation, when the instructions are executed by the server, after performing the step of sending, to the electronic device, the notification indicating that no permission authorization record of the first application is found, the server is further enabled to perform the following step: obtaining information about a device group selected by the user for the electronic device. When the instructions are executed by the server, that the server is enabled to perform the step of storing the permission confirmation information of the first application in the permission policy table corresponding to the user account includes: If the distributed authorization mode of the user account is device group authorization, and the electronic device has not joined a device group, the server adds an entry corresponding to the electronic device to a device group member table corresponding to the user account, and records, in the added entry, a correspondence between the electronic device and the device group selected by the user. The server further adds an entry of the electronic device to the single-device application permission policy table corresponding to the user account, and sets the permission policy of the first application to follow in the added entry. The server adds a permission authorization record of the first application to an entry corresponding to the device group selected by the user in the device group application permission policy table corresponding to the user account.

In a possible implementation, when the instructions are executed by the server, before the server is enabled to perform the step of receiving the permission query request that is for the first application and that is sent by the electronic device, the server further perform the following steps: A notification that indicates that the first application is installed and that is sent by the electronic device is received. Entries corresponding to the electronic device and the first application are added to an application installation table corresponding to the user account currently logged in to the electronic device, and an event that the first application is installed on the electronic device is recorded in the foregoing entries.

In a possible implementation, when the instructions are executed by the server, the server is enabled to further perform the following steps: A notification that indicates that the first application is uninstalled and that is sent by the electronic device is received. The entries corresponding to the electronic device and the first application are deleted from the application installation table corresponding to the user account. If the application installation table corresponding to the user account shows that the first application is not installed on the electronic device, an entry corresponding to the first application is deleted from the permission policy table corresponding to the user account. The permission policy table corresponding to the user account includes the single-device application permission policy table, the device group application permission policy table, and the all-device application permission policy table.

In a possible implementation, when the instructions are executed by the server, the server is enabled to further perform the following steps: A distributed authorization mode sent by the electronic device is received. The distributed authorization mode is a distributed authorization mode selected by the user and obtained after the user account is logged in to the electronic device for the first time. The distributed authorization mode includes single-device authorization, device group authorization, and all-device authorization. The distributed authorization mode is recorded in a distributed application authorization mode table corresponding to the user account.

In a possible implementation, when the instructions are executed by the server, the server is enabled to further perform the following steps: An event that the user account is successfully logged in to another electronic device other than the electronic device. The another electronic device is notified to display a permission synchronization interface to a user who uses the another electronic device. Information that is sent by the another electronic device and that indicates that the user who uses the another electronic device confirms application permission synchronization is received, and a permission authorization record of the first application is sent to the another electronic device. An entry corresponding to the another electronic device is added to the login device table corresponding to the user account, and an event that the user account is logged in to the another electronic device is recorded in the added entry.

In a possible implementation, when the instructions are executed by the server, after the server is enabled to perform the step of notifying the another electronic device to display the permission synchronization interface to the user who uses the another electronic device, the server further performs the following steps: Information that is sent by the another electronic device and that is of a device group selected by the user for the another electronic device. The permission authorization record of the first application is sent to the another electronic device. An entry corresponding to the another electronic device is added to the login device table corresponding to the user account, and an event that the user account is logged in to the another electronic device is recorded in the added entry. An entry corresponding to the another electronic device is added to a device group member table corresponding to the user account, and a correspondence between the another electronic device and the group device to which the another electronic device belongs in the added entry.

In a possible implementation, when the instructions are executed by the server, the server is enabled to further perform the following step: after the electronic device starts the first application, an event that the user account is logged out from the electronic device is obtained, and the status of the electronic device is updated to logout in the login device table corresponding to the user account.

In a possible implementation, when the instructions are executed by the server, after the server is enabled to perform the step of updating, in the login device table corresponding to the user account, the status of the electronic device to logout, the server may further perform the following steps: An event that the user account is re-logged in to the electronic device is obtained, and the electronic device is notified to display a permission application interface to the user. The permission application interface displays information about whether to use application permission corresponding to the user account. Then, information that is sent by the electronic device and that indicates that the user determines to use the application permission corresponding to the user account is received, and the status of the electronic device is updated to login in the login device table corresponding to the user account.

It should be understood that technical solutions in the third and the fifth aspects of embodiments of this application are consistent with technical solutions in the first aspect of embodiments of this application, and beneficial effects achieved by the aspects and corresponding feasible implementations are similar. Details are not described again.

It should be understood that technical solutions in the fourth and the sixth aspects of embodiments of this application are consistent with technical solutions in the second aspect of embodiments of this application, and beneficial effects achieved by the aspects and corresponding feasible implementations are similar. Details are not described again.

According to a seventh aspect, an embodiment of this application provides a computer-readable storage medium. The computer-readable storage medium stores a computer program, and when the computer program is run on a computer, the computer is enabled to perform the method according to the first aspect.

According to an eighth aspect, this application provides a computer-readable storage medium. The computer-readable storage medium stores a computer program, and when the computer program is run on a computer, the computer is enabled to perform the method according to the second aspect.

According to a ninth aspect, this application provides a computer program. When being executed by a computer, the computer program is used to perform the method according to the first aspect.

According to a tenth aspect, this application provides a computer program. When being executed by a computer, the computer program is used to perform the method according to the second aspect.

In a possible design, the program in the ninth aspect and the tenth aspect may be all or partially stored in a storage medium that is encapsulated with a processor, or may be all or partially stored in a memory that is not encapsulated with a processor.

BRIEF DESCRIPTION OF THE DRAWINGS

FIG. 9(*c*) is a schematic diagram of a distributed authorization mode interface according to an embodiment of this application;

FIG. 11(*b*) is a schematic diagram of a second permission synchronization interface according to an embodiment of this application;

FIG. 12(*b*) is a schematic diagram of an application permission management interface according to an embodiment of this application;

FIG. 12(*c*) is a schematic diagram of a permission interface of APP 1 according to an embodiment of this application;

FIG. 12(*d*) is a schematic diagram of a permission modification interface according to an embodiment of this application;

FIG. 12(*e*) is a schematic diagram of a permission modification interface according to another embodiment of this application;

DETAILED DESCRIPTION OF ILLUSTRATIVE EMBODIMENTS

Terms used in embodiments of this application are only used to explain specific embodiments of this application, but are not intended to limit this application.

In the conventional technology, a dynamic authorization mechanism is used for permission authorization of an application in an electronic device. When the application needs to use permission, a dialog box is displayed for a user to confirm authorization. In this way, in a scenario in which a same application is installed on a plurality of devices, the user needs to repeatedly confirm authorization, and an operation is excessively complex. Embodiments of this application provide an application permission management method, to reduce such complex confirmation operations in a pop-up dialog box without reducing security of an operating system of an electronic device, thereby improving user experience.

Figure 1:
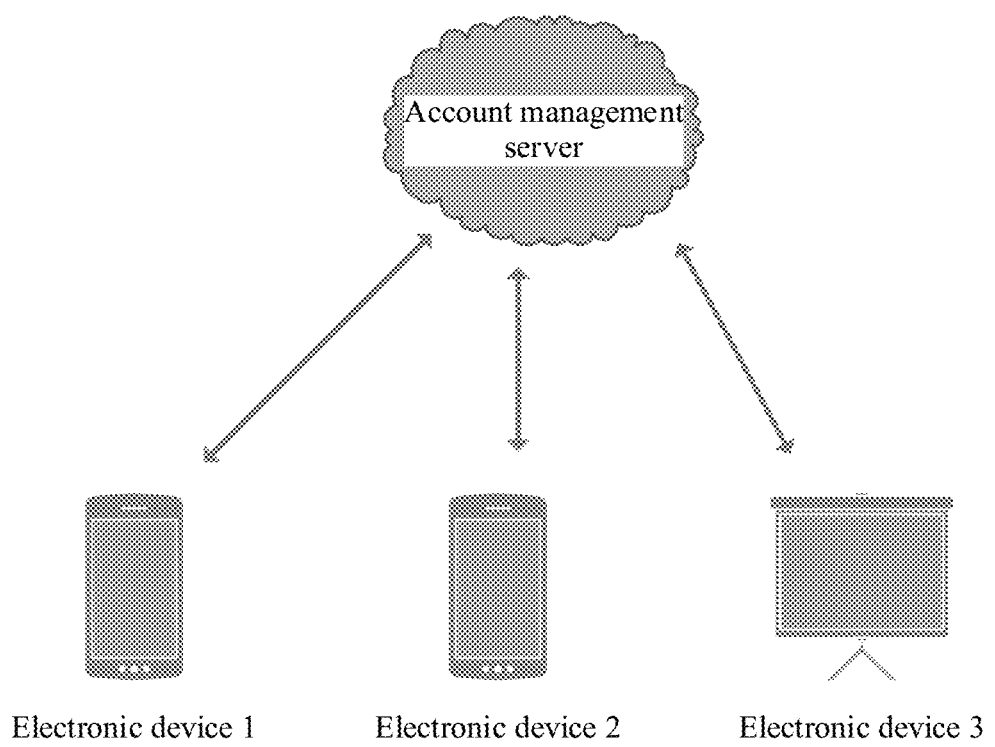
FIG. 1 is a schematic diagram of an application scenario according to an embodiment of this application.

The application permission management method provided in this embodiment of this application may be applied to a scenario of a plurality of distributed devices. As shown in FIG. 1, the method includes a plurality of distributed devices and a cloud server. FIG. 1 is a schematic diagram of an application scenario according to an embodiment of this application.

In FIG. 1, the cloud server may be an account management server that provides account-based distributed application permission configuration management, and may provide a distributed application authorization mode selection function and an application permission configuration management function.

The distributed application authorization mode is used to synchronize distributed permission policies when an application is started for the first time. The distributed application authorization mode is classified into single-device authorization, device group authorization, and all-device authorization.

Application permission configuration management allows users to grant and revoke permission of application granularity for a single device, a device group, or all devices.

The following services are provided on the electronic device:

1. Application installation service: It is used for local application installation and is responsible for application registration and installation.
2. Application startup service: It is used when local applications are started, and is responsible for resource allocation, permission query, and processing.
3. Permission configuration management service: It is a permission configuration management service of local applications and is responsible for determining whether to use a local authorization policy or an account authorization policy.
4. Account management service: It functions as a local agent of a cloud account management service and interacts with the cloud server.

The electronic device may be a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like. A specific type of the electronic device is not limited in embodiments of this application.

Figure 2:
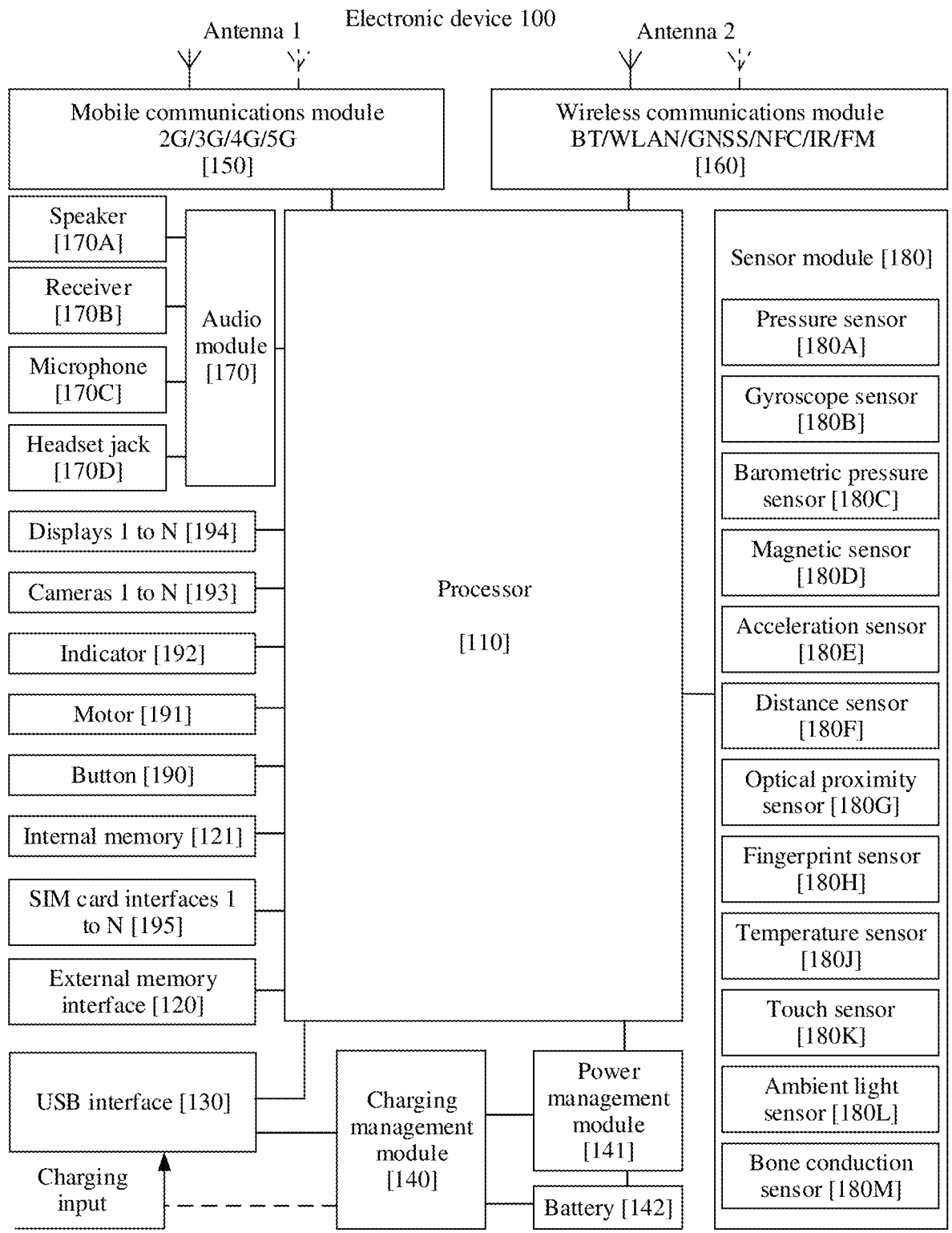
FIG. 2 is a schematic diagram of a structure of an electronic device according to an embodiment of this application.

For example, FIG. 2 is a schematic diagram of a structure of an electronic device according to an embodiment of this application. As shown in FIG. 2, an electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction executing.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

An I2S interface maybe configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used for audio communication, and samples, quantizes, and encodes an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be used for audio communication.

The UART interface is a universal serial data bus used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that meets a USB standard specification, and may be specifically a mini USB interface, a micro USB interface, a USB type C interface, or the like. The USB interface 130 may be configured to connect to a charger to charge the electronic device 100, or may be configured to transmit data between the electronic device 100 and a peripheral device, or may be configured to connect to a headset for playing audio by using the headset. The interface may be further configured to connect to another electronic device such as an AR device.

It may be understood that an interface connection relationship between the modules shown in this embodiment of the present invention is merely used as an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive charging input of a wired charger through the USB interface 130. In some embodiments of wireless charging, the charging management module 140 may receive wireless charging input through a wireless charging coil of the electronic device 100. The charging management module 140 may further supply power to the electronic device 100 through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution that is applied to the electronic device 100 and includes wireless communication such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video coder/decoder, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is executed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system of a layered architecture is used as an example to illustrate the software structure of the electronic device 100.

Figure 3:
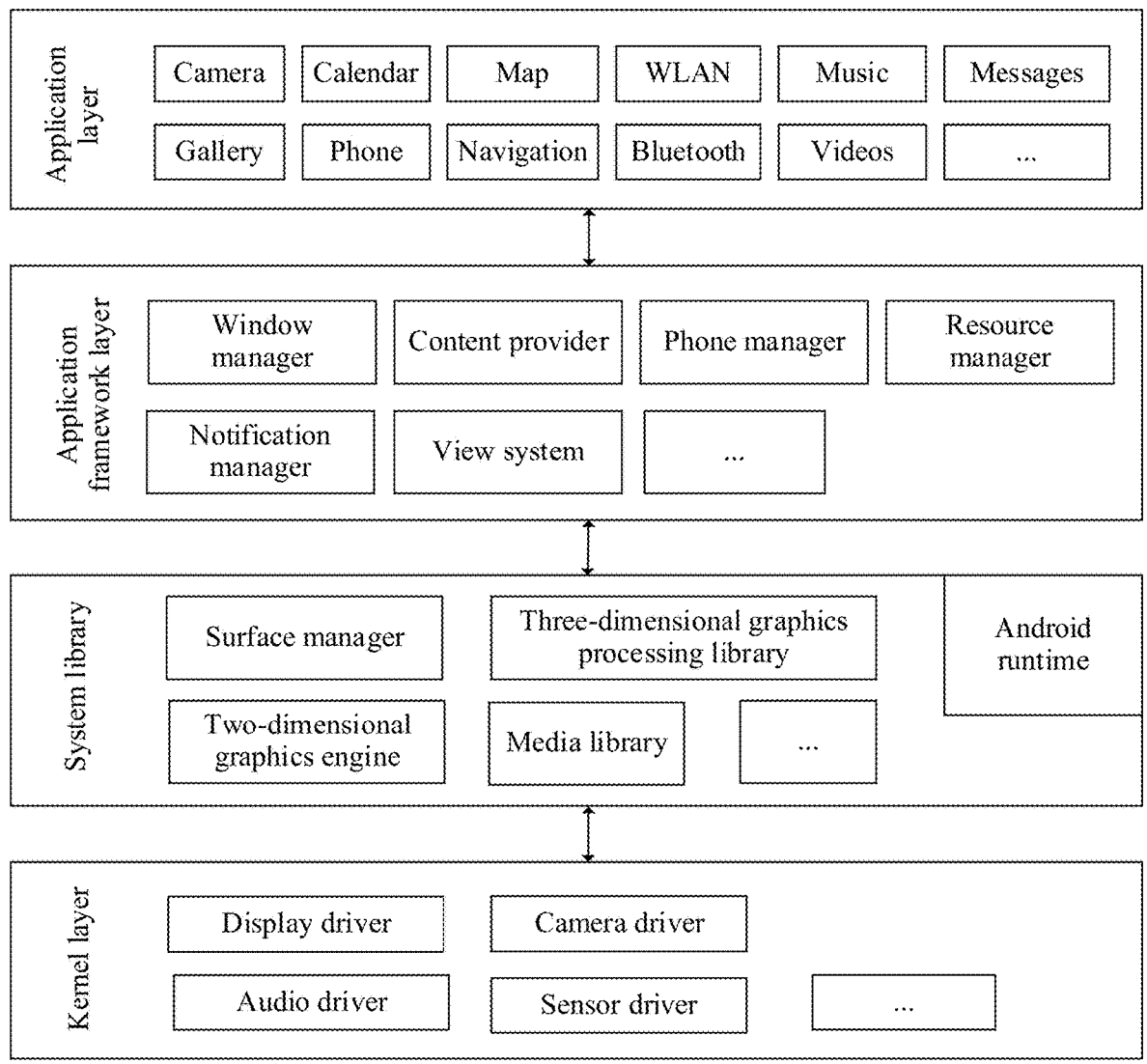
FIG. 3 is a block diagram of a software structure of an electronic device 100 according to an embodiment of this application.

FIG. 3 is a block diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In addition, as shown in FIG. 1, implementation of the application permission management method provided in this embodiment of this application not only relates to an electronic device side, but also relates to a server side. The server may be disposed in a cloud. Certainly, the server may alternatively be implemented by using a common physical server. A specific type of the server is not limited in this embodiment of this application.

Figure 4:
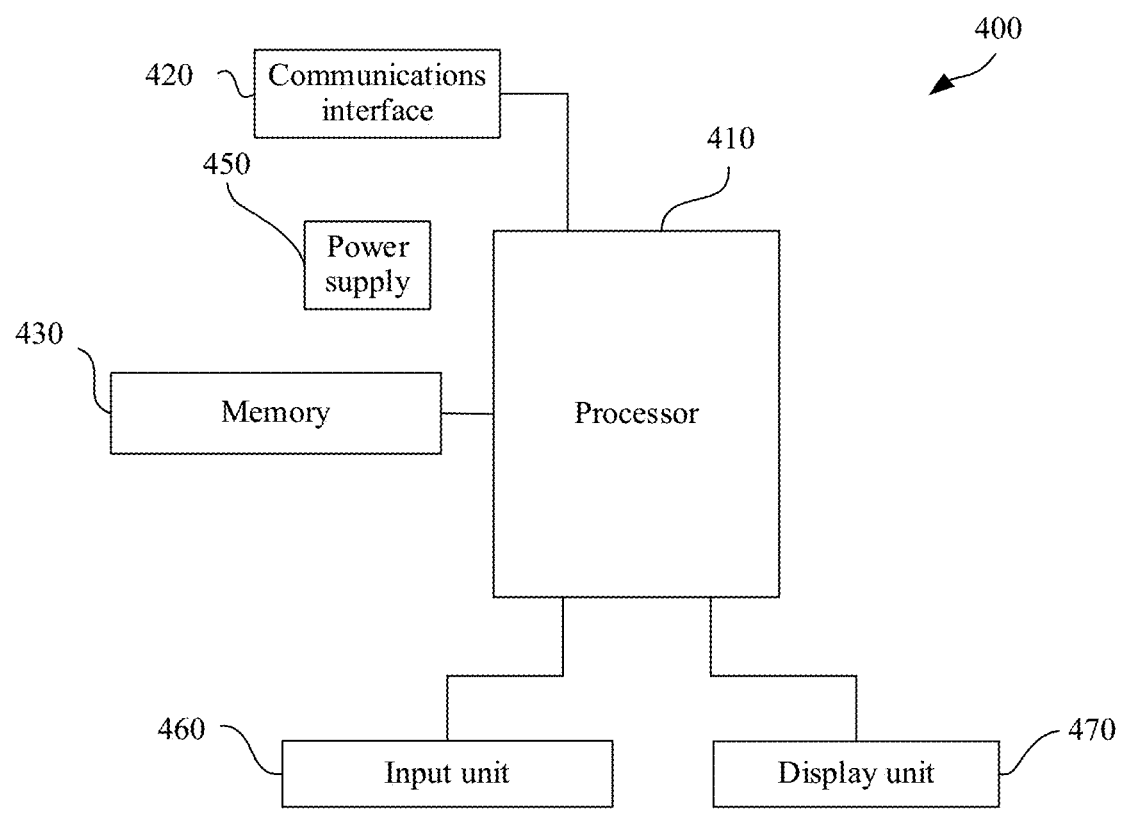
FIG. 4 is a schematic diagram of a structure of a server 400 according to an embodiment of this application.

For example, FIG. 4 is a schematic diagram of a structure of a server according to an embodiment of this application. As shown in FIG. 4, an account management server 400 may include a processor 410 and a communications interface 420. Optionally, the account management server 400 may further include a memory 430. The processor 410, the communications interface 420, and the memory 430 may communicate with each other by using an internal connection path, to transmit a control signal and/or a data signal. The memory 430 is configured to store a computer program. The processor 410 is configured to invoke the computer program from the memory 430 and run the computer program.

The processor 410 and the memory 430 may be combined into one processing apparatus, and are more commonly components independent of each other. The processor 410 is configured to execute program code stored in the memory 430. During specific implementation, the memory 430 may alternatively be integrated into the processor 410, or independent of the processor 410.

In addition, to improve a function of the server 400, the server 400 may further include one or more of an input unit 460, a display unit 470, and the like.

Optionally, the server 400 may further include a power supply 450, configured to supply power to various components or circuits in the server 400.

It should be understood that the processor 410 in the server 400 shown in FIG. 4 may be a system on chip SOC. The processor 410 may include a central processing unit (central processing unit, CPU), and may further include another type of processor, for example, a graphics processing unit (graphics processing unit, GPU).

For ease of understanding, in the following embodiments of this application, the electronic device having the structures shown in FIG. 2 and FIG. 3 and the server having the structure shown in FIG. 4 are used as an example to describe in detail the application permission management method provided in embodiments of this application with reference to the accompanying drawings and application scenarios.

Figure 5:
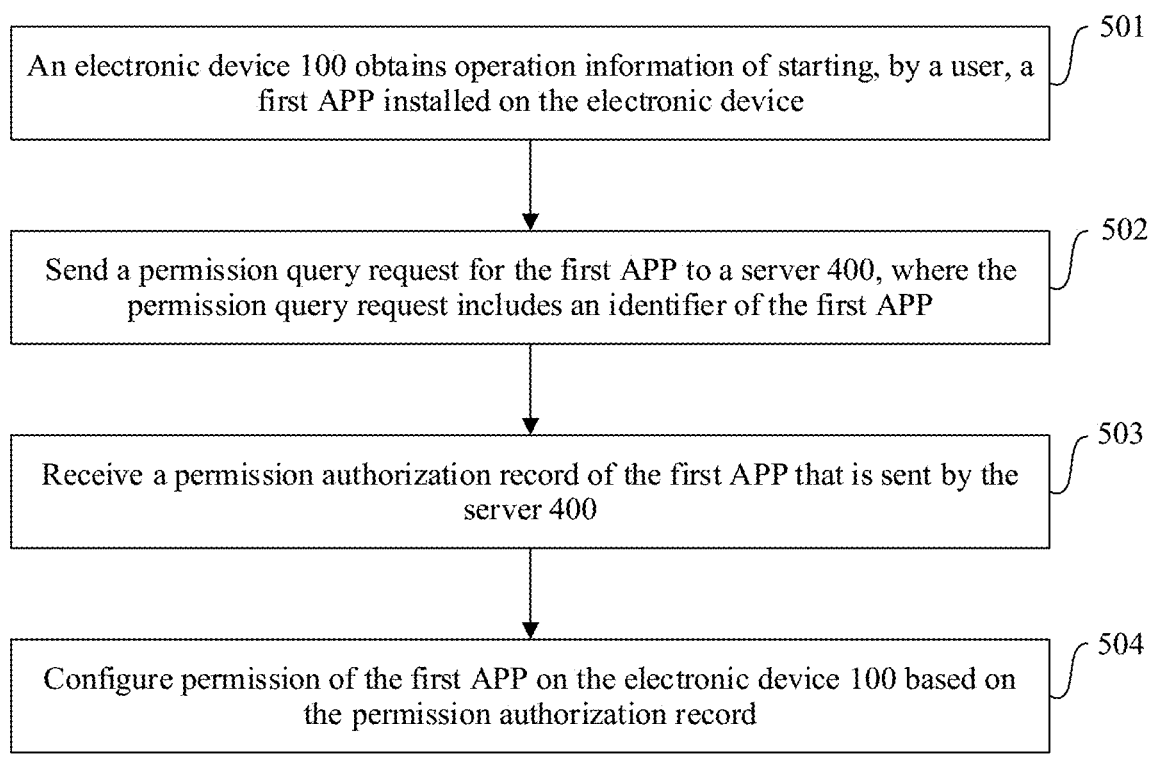
FIG. 5 is a flowchart of an application permission management method according to an embodiment of this application.

FIG. 5 is a flowchart of an application permission management method according to an embodiment of this application. As shown in FIG. 5, the application permission management method may include the following steps.

Step 501: The electronic device 100 obtains operation information of starting, by a user, a first APP installed on the electronic device.

The operation information may include an operation such as tapping, double tapping, or touching and holding performed by the user on an icon of the first APP, or the operation information may be a voice instruction entered by the user to start the first APP. An operation form of the operation information is not limited in this embodiment.

Specifically, the electronic device 100 may implement the operation of step 501 by using the processor 110 and the touch sensor 180K.

Step 502: Send a permission query request for the first APP to the server 400, where the permission query request includes an identifier of the first APP.

The device identifier of the electronic device 100 may be a device name of the electronic device 100, an international mobile equipment identity (international mobile equipment identity, IMEI) of the electronic device 100, or a card number of a subscriber identity module (subscriber identity module, SIM) card installed in the electronic device 100. A form of the device identifier of the electronic device 100 is not limited in this embodiment.

The identifier of the first APP may be information that can uniquely indicate the first APP, such as a name (package name) or an application identifier (APP ID) of the first APP. A form of the first APP is not limited in this embodiment.

Specifically, a permission configuration management service in the electronic device 100 may send the permission query request for the first APP to the server 400.

Step 503: Receive a permission authorization record of the first APP that is sent by the server 400.

During specific implementation, the electronic device 100 may send and receive information to and from the server 400 by using the processor 110, the antenna 1, and the mobile communications module 150, and/or by using the processor 110, the antenna 2, and the wireless communications module 160.

Step 504: Configure permission of the first APP on the electronic device 100 based on the permission authorization record.

Figure 5A:
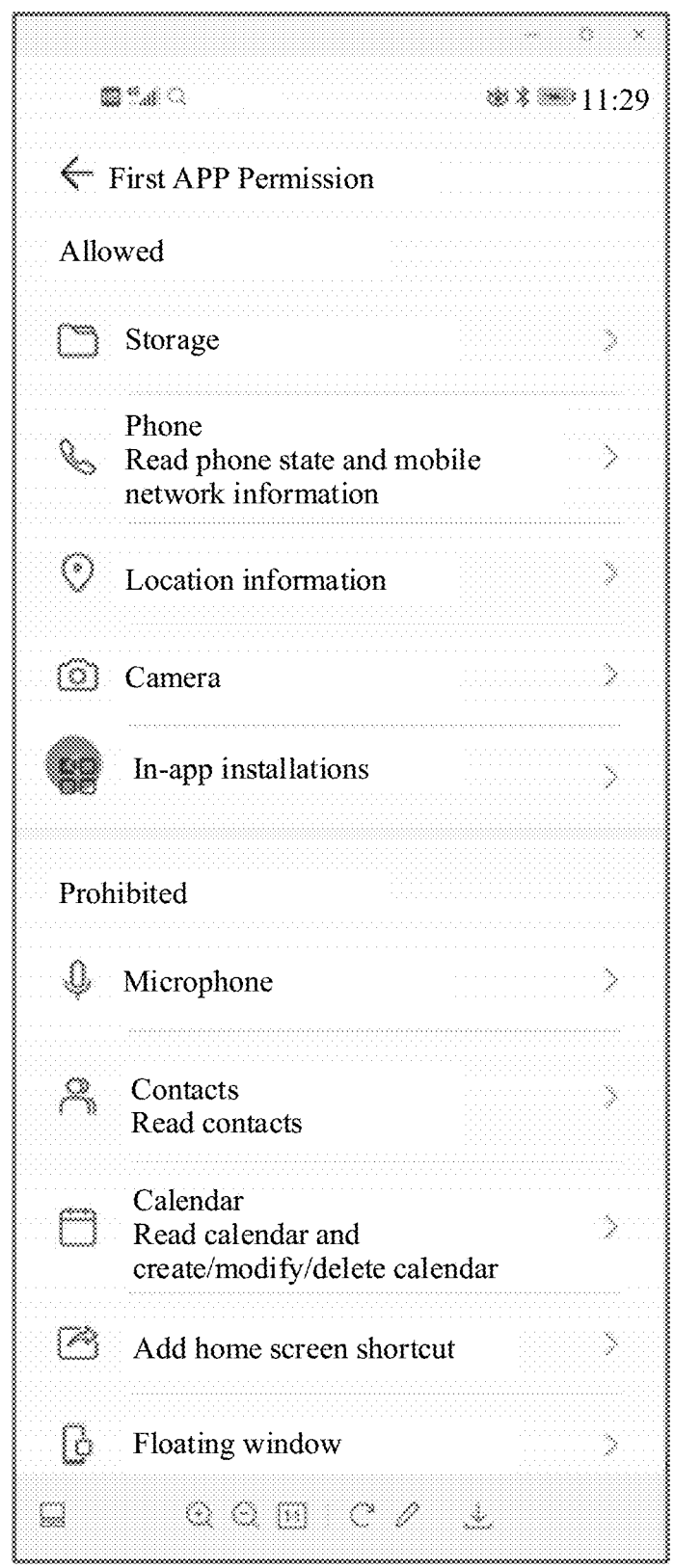
FIG. 5(a) and FIG. 5(b) are schematic diagrams of permission of a first APP according to an embodiment of this application.
Figure 5B:
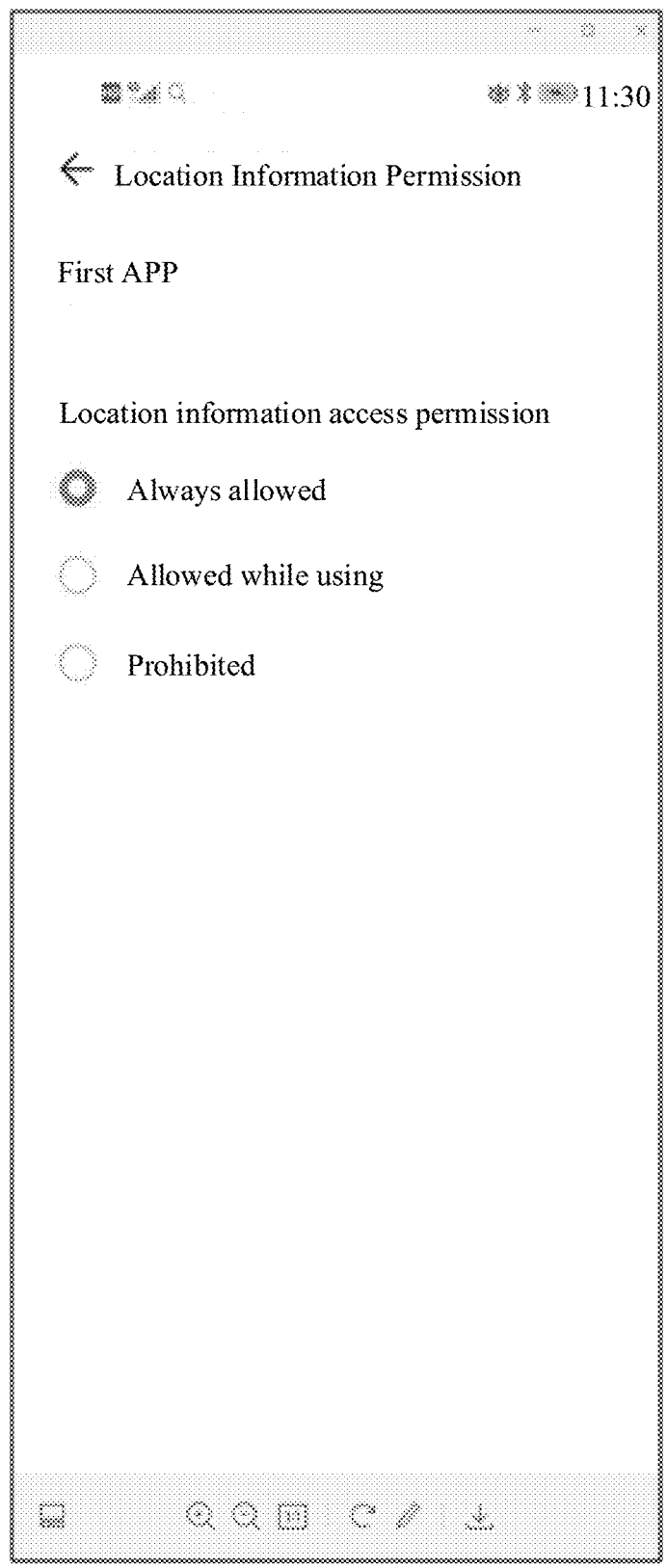

In this embodiment, the permission of the first APP configured by the electronic device 100 may be shown in FIG. 5(a) and FIG. 5(b). FIG. 5(a) and FIG. 5(b) are schematic diagrams of permission of the first APP according to an embodiment of this application. Referring to FIG. 5(a), the permission that is of the first APP on the electronic device 100 and that is configured by the electronic device 100 may be classified into two types: "Allowed" and "Prohibited". "Allowed" permission of may include storage, a call, location information, a camera, and installing another application in the application. "Prohibited" permission may include a microphone, an address book, a calendar, creating a desktop shortcut, a floating window, and the like. For the "Allowed" permission, using the location information permission as an example, referring to FIG. 5(b), location information access permission may be configured as "Always allowed" or "Allowed while using".

Specifically, the electronic device 100 may implement the operation of step 504 by using the processor 110.

In the application permission management method, after obtaining the operation information for starting the first APP installed in the electronic device by the user, the electronic device 100 sends the permission query request for the first APP to the server 400, and then the electronic device 100 receives the permission authorization record of the first APP sent by the server 400. The permission of the first APP on the electronic device is configured based on the permission authorization record, so that a permission confirmation operation of installing a same application on different distributed devices for a plurality of times can be simplified. In this way, complex operations of popping up a dialog box for a user to confirm are reduced, and use experience is improved.

Figure 6:
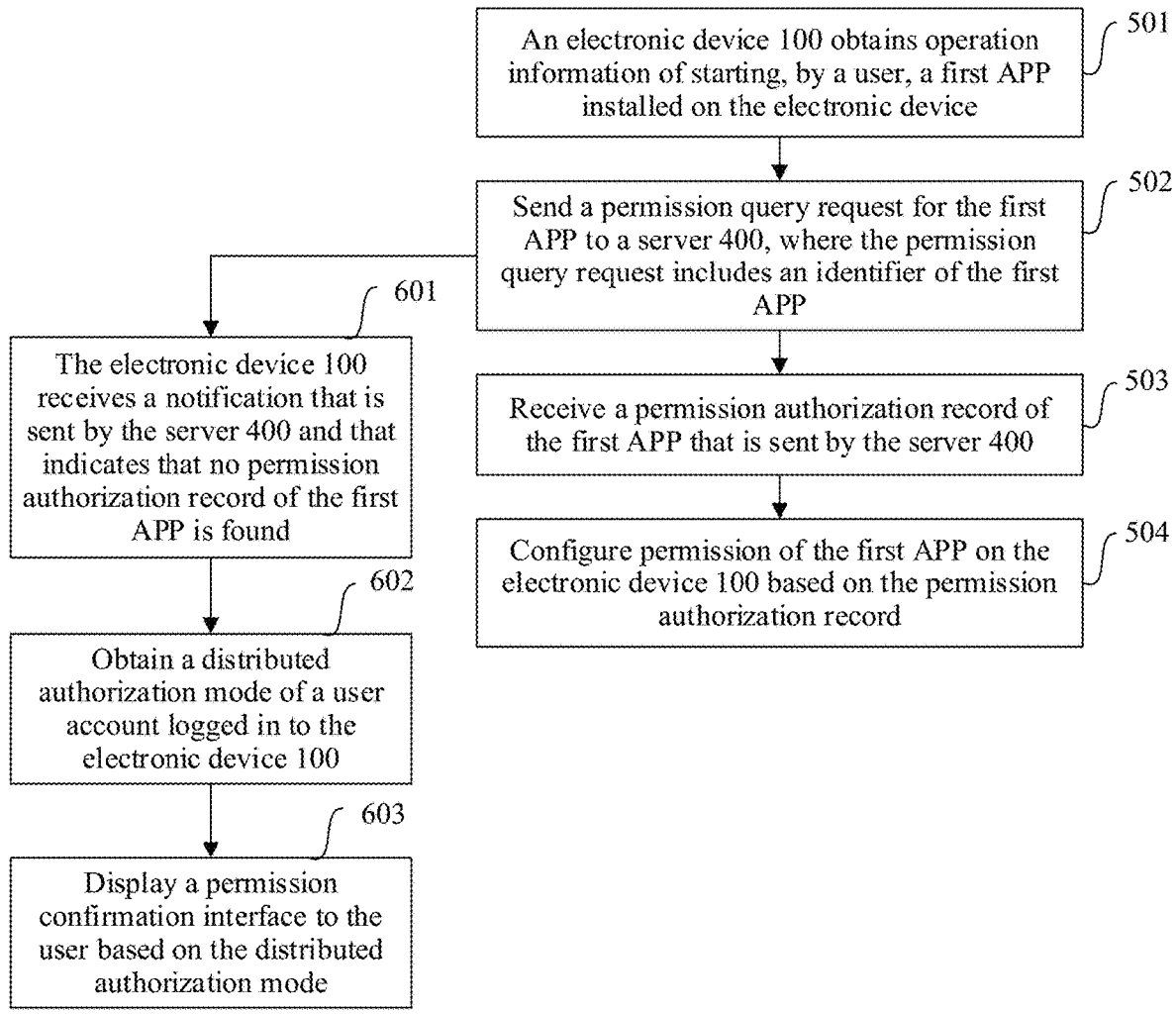
FIG. 6 is a flowchart of an application permission management method according to another embodiment of this application.

FIG. 6 is a flowchart of an application permission management method according to another embodiment of this application. As shown in FIG. 6, in the embodiment shown in FIG. 5 of this application, after step 502, the method may further include the following steps.

Step 601: The electronic device 100 receives a notification that is sent by the server 400 and that indicates that no permission authorization record of the first APP is found.

Step 602: A distributed authorization mode of a user account logged in to the electronic device 100 is obtained.

Step 603: A permission confirmation interface is displayed to the user based on the distributed authorization mode.

Specifically, that the permission confirmation interface is displayed to the user based on the distributed authorization mode may be as follows: When the distributed authorization mode is single-device authorization or all-device authorization, or when the distributed authorization mode is device group authorization and the electronic device 100 has joined a device group, a first permission confirmation interface is displayed to the user. When the distributed authorization mode is device group authorization and the electronic device 100 has not joined a device group, a second permission confirmation interface is displayed to the user, where the second permission confirmation interface includes information of selecting a device group for the electronic device 100 to join.

Further, after displaying the first permission confirmation interface to the user, the electronic device 100 may further obtain permission confirmation information of the first APP from the first permission confirmation interface, send the permission confirmation information of the first APP to the server 400, and configure permission of the first APP on the electronic device 100 based on the permission confirmation information of the first APP.

Further, after displaying the second permission confirmation interface to the user, the electronic device 100 may further obtain, from the second permission confirmation interface, the permission confirmation information of the first APP and information about a device group selected by the user for the electronic device 100, send the permission confirmation information of the first APP and the information about the device group selected by the user for the electronic device 100 to the server 400, and configure the permission of the first APP on the electronic device 100 based on the permission confirmation information of the first APP.

Figure 7A:
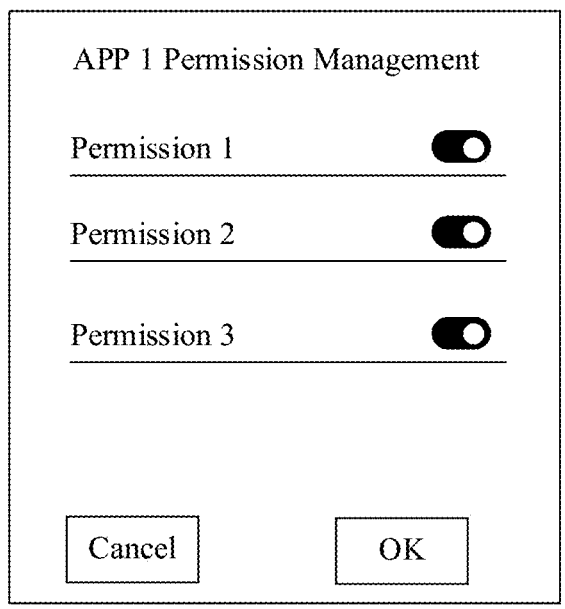
FIG. 7(a) is a schematic diagram of a first permission confirmation interface according to an embodiment of this application.

Specifically, the first permission confirmation interface displayed by the electronic device 100 to the user may be shown in FIG. 7(a). FIG. 7(a) is a schematic diagram of the first permission confirmation interface according to an embodiment of this application. After the electronic device 100 displays the interface shown in FIG. 7(a), the user may select, on the interface shown in FIG. 7(a) by using a permission selection switch, permission (Permission 1, Permission 2, and Permission 3) required by the first APP. For example, the user sets a status of a permission selection switch of Permission 1 to an "on" state, indicating that the user authorizes the first APP to obtain Permission 1. After the user sets statuses of permission selection switches of Permission 1, Permission 2, and Permission 3, the user taps an "OK" icon on the permission confirmation interface. Then, the electronic device 100 may obtain the permission confirmation information of the first APP, and may further configure the permission of the first APP on the electronic device 100 based on the permission confirmation information of the first APP.

Figure 7B:
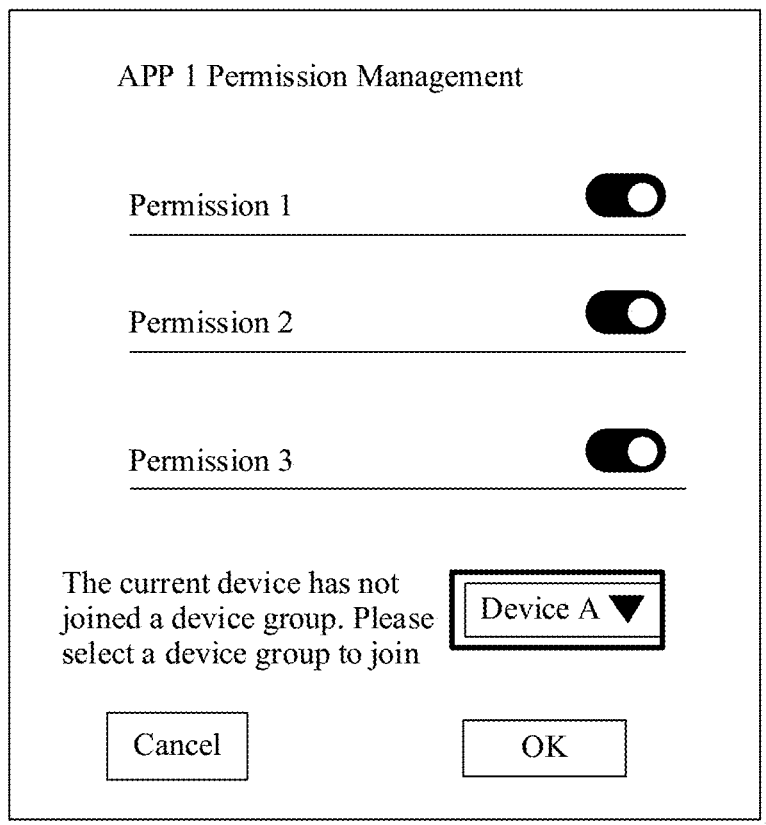
FIG. 7(b) is a schematic diagram of a second permission confirmation interface according to an embodiment of this application.

Specifically, the second permission confirmation interface displayed by the electronic device 100 to the user may be shown in FIG. 7(b). FIG. 7(b) is a schematic diagram of the second permission confirmation interface according to an embodiment of this application. Compared with the second permission confirmation interface in FIG. 7(a), a difference lies in that the second permission confirmation interface shown in FIG. 7(b) includes information of "The current device has not joined a device group. Please select a device group to join". In other words, the second permission confirmation interface displayed by the electronic device 100 includes the information of selecting a device group for the electronic device 100 to join. The user may select, in a device group selection box shown in FIG. 7(b), the device group that the electronic device 100 needs to join, for example, a device group A.

After the user completes setting the states of the permission selection switches of Permission 1, Permission 2, and Permission 3 in the interface shown in FIG. 7(b), the device group that the electronic device 100 needs to join is selected, and the "OK" icon in the interface shown in FIG. 7(b) is tapped, the electronic device 100 may obtain the permission confirmation information of the first APP and the information about the device group selected by the user for the electronic device 100.

Specifically, the electronic device 100 may implement, by using the processor 110 and the display 194, an operation of displaying the first permission confirmation interface and the second permission confirmation interface, implement, by using the processor 110 and the touch sensor 180K, an operation of obtaining the permission confirmation information and the information about the device group, and implement, by using the processor 110, an operation of configuring the permission of the first APP on the electronic device 100.

In the embodiment shown in FIG. 6 of this application, an example in which the user taps the "OK" icon in FIG. 7(a) or FIG. 7(b) is used for description of a confirmation form of the user. Certainly, this embodiment is not limited thereto, and the confirmation form of the user may also be set to biometric feature recognition, for example, fingerprint recognition or iris recognition. In other words, after setting the statuses of the permission selection switches of Permission 1, Permission 2, and Permission 3, the user needs to enter a fingerprint or an iris for confirmation, thereby improving permission setting reliability.

Figure 8:
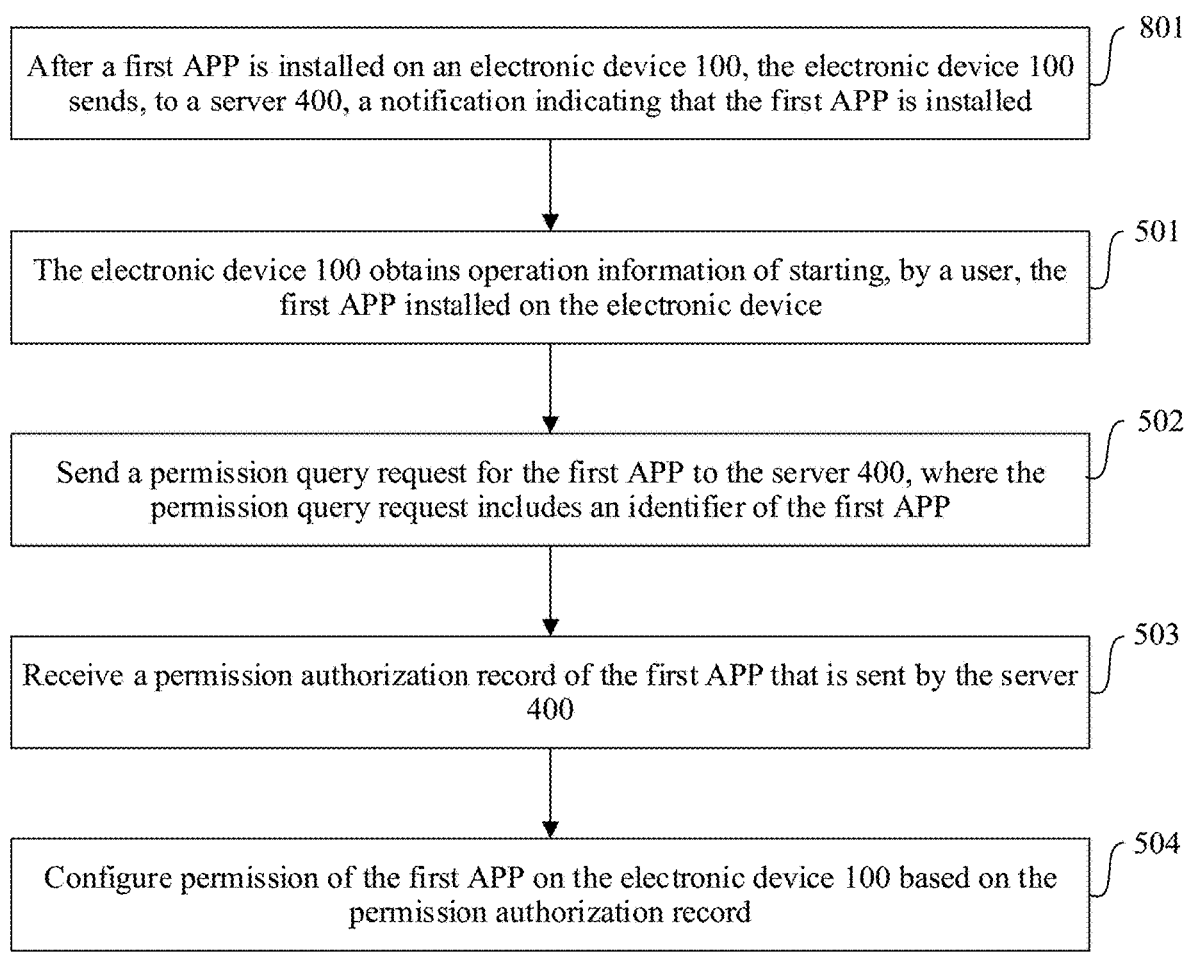
FIG. 8 is a flowchart of an application permission management method according to still another embodiment of this application.

FIG. 8 is a flowchart of an application permission management method according to another embodiment of this application. As shown in FIG. 8, in the embodiment shown in FIG. 5 of this application, before step 501, the method may further include the following steps.

Step 801: After the first APP is installed on the electronic device 100, the electronic device 100 sends, to the server 400, a notification indicating that the first APP is installed.

Further, after the first APP is uninstalled from the electronic device 100, the electronic device 100 may send, to the server 400, a notification indicating that the first APP is uninstalled.

Specifically, the electronic device 100 may send and receive information to and from the server 400 by using the processor 110, the antenna 1, and the mobile communications module 150, and/or by using the processor 110, the antenna 2, and the wireless communications module 160.

In a possible implementation of the embodiments shown in FIG. 5, FIG. 6, and FIG. 8 of this application, after the user account is logged in to the electronic device 100 for the first time, the electronic device 100 may display an account permission management interface to the user, and then the electronic device 100 obtains a permission authorization mode selected by the user on the account permission management interface. If the permission authorization mode selected by the user is distributed authorization, a distributed authorization mode interface is displayed to the user, and distributed authorization modes are displayed in the distributed authorization mode interface. The distributed authorization modes include single-device authorization, device group authorization, and all-device authorization. Next, the electronic device 100 obtains a distributed authorization mode selected by the user, and sends the distributed authorization mode selected by the user to the server 400.

Figure 9A:
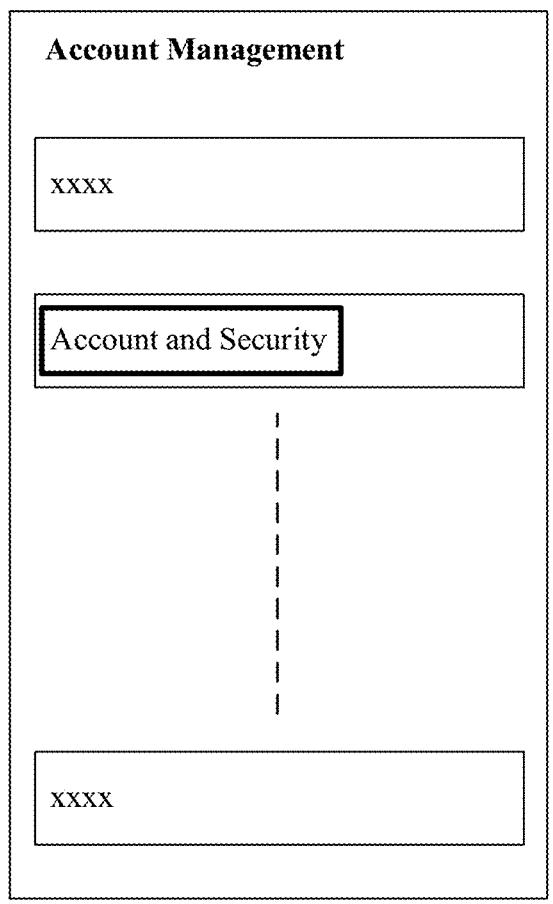
FIG. 9(a) is a schematic diagram of an account management interface according to an embodiment of this application.
Figure 9B:
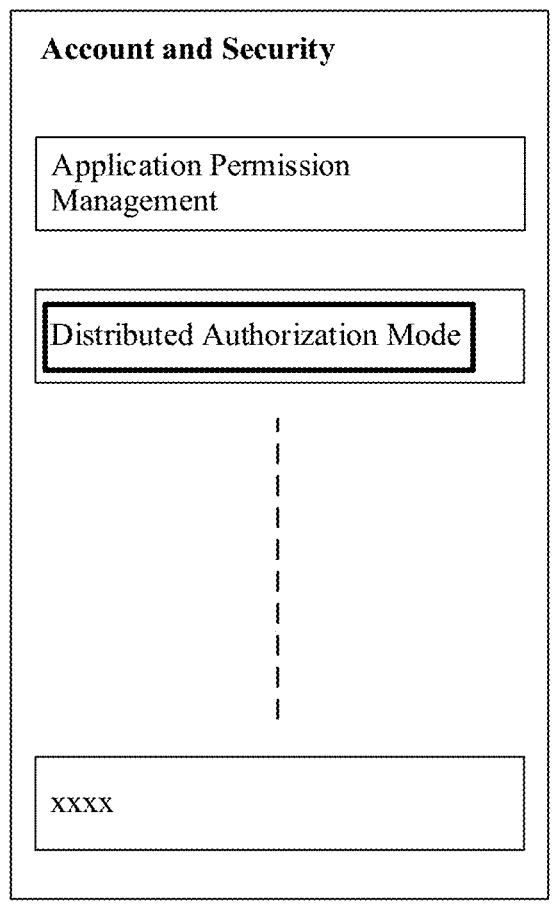
FIG. 9(*b*) is a schematic diagram of an account permission management interface according to an embodiment of this application.
Figure 9C:
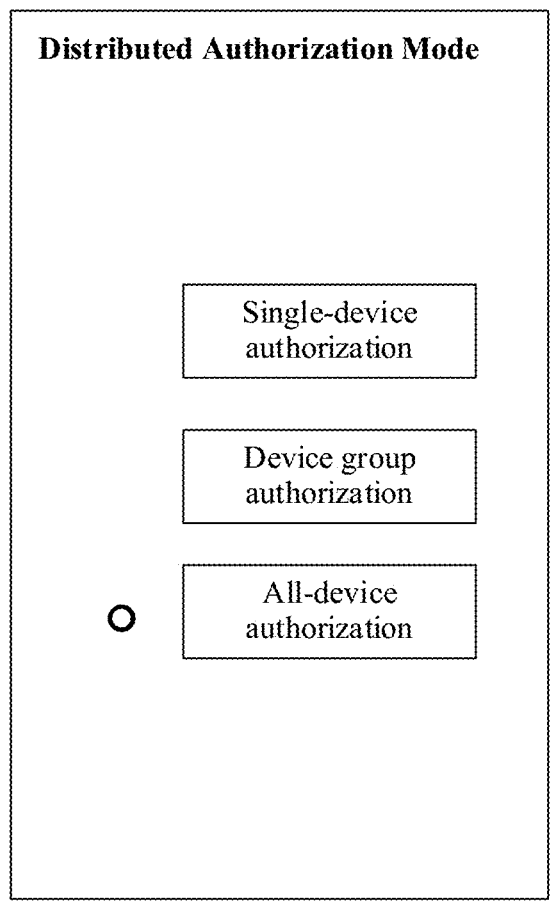

Specifically, after the user account is logged in to the electronic device 100 for the first time, the electronic device 100 first displays an account management interface shown in FIG. 9(a). After the user selects "Account and Security" in the interface shown in FIG. 9(a), the electronic device 100 displays the account permission management interface shown in FIG. 9(b). If the permission authorization mode selected by the user on the account permission management interface is "Distributed authorization mode", the electronic device 100 displays a distributed authorization mode interface shown in FIG. 9(c), and displays distributed authorization modes on the distributed authorization mode interface. The distributed authorization modes include single-device authorization, device group authorization, and all-device authorization. After the user selects a distributed authorization mode (for example, all-device authorization) on the distributed authorization mode interface shown in FIG. 9(c), the electronic device 100 may obtain the distributed authorization mode selected by the user, and send the distributed authorization mode selected by the user to the server 400. FIG. 9(a) is a schematic diagram of the account management interface according to an embodiment of this application. FIG. 9(b) is a schematic diagram of the account permission management interface according to an embodiment of this application. FIG. 9(c) is a schematic diagram of the distributed authorization mode interface according to an embodiment of this application.

In another possible implementation of the embodiments shown in FIG. 5, FIG. 6, and FIG. 8 of this application, after the user account is logged out from the electronic device 100 and the user account is re-logged in to the electronic device 100, the electronic device 100 may further receive a notification that is sent by the server 400 and that is of displaying a permission application interface to the user. Therefore, the electronic device 100 displays the permission application interface to the user, and displays, in the permission application interface, information about whether to use application permission corresponding to the user account. The electronic device 100 obtains information indicating that the user determines to use the application permission corresponding to the user account, and sends, to the server 400, the information indicating that the user determines to use the application permission corresponding to the user account.

Figure 10:
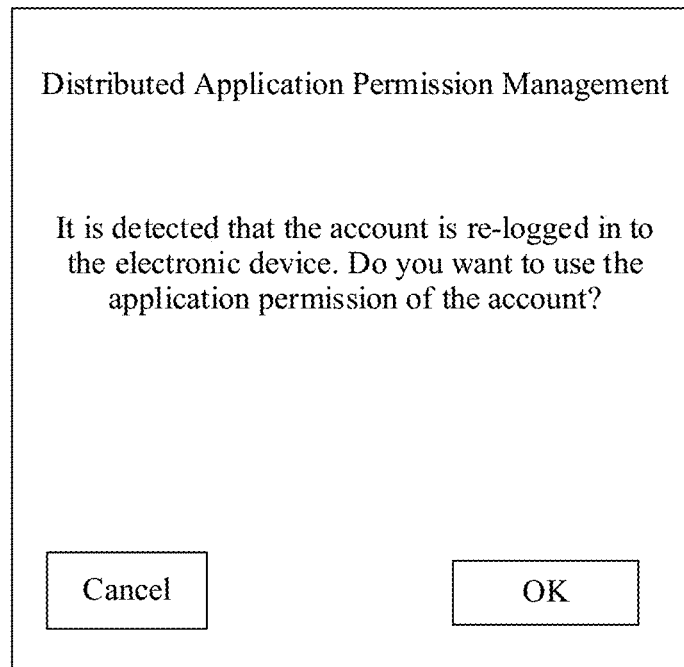
FIG. 10 is a schematic diagram of a permission application interface according to an embodiment of this application.

The permission application interface may be as shown in FIG. 10. FIG. 10 is a schematic diagram of the permission application interface according to an embodiment of this application. The permission application interface shown in FIG. 10 includes information of "It is detected that the account is re-logged in to the electronic device. Do you want to use the application permission of the account?". If the user taps an "OK" icon in the permission application interface shown in FIG. 10, the electronic device 100 may obtain the information indicating that the user determines to use the application permission corresponding to the user account, and then the electronic device 100 sends, to the server 400, the information indicating that the user determines to use the application permission corresponding to the user account.

In this implementation, after the user account that is logged in to the electronic device is logged out, if the user account is logged in to the electronic device again, the electronic device displays a permission application interface, to prompt the user whether to continue to apply the permission of the user account, thereby improving permission security.

In still another possible implementation of the embodiments shown in FIG. 5, FIG. 6, and FIG. 8 of this application, after the user account is logged in to the electronic device 100, the electronic device 100 may further receive a notification that is sent by the server 400 and that is of displaying a permission synchronization interface. Then, the electronic device 100 obtains a distributed authorization mode of the user account logged in to the electronic device 100. When the distributed authorization mode of the user account is all-device authorization, or the distributed authorization mode is device group authorization and the electronic device 100 has joined a device group, a first permission synchronization interface is displayed to the user, and information about whether to synchronize application permission is displayed in the first permission synchronization interface. Then, the electronic device 100 obtains information indicating that the user determines to perform application permission synchronization, sends the information indicating that the user determines to perform application permission synchronization to the server 400, receives a permission authorization record of the first APP sent by the server 400, and configures the permission of the first APP on the electronic device 100 based on the permission authorization record.

Further, after the distributed authorization mode of the user account logged in to the electronic device 100 is obtained, when the distributed authorization mode of the user account is device group authorization, and the electronic device 100 has not joined a device group, the electronic device 100 may display a second permission synchronization interface to the user, and display, in the second permission synchronization interface, information about whether to synchronize application permission and information of selecting a device group for the electronic device 100 to join. Then, the electronic device 100 obtains information indicating that the user determines to perform application permission synchronization and information about a device group selected by the user for the electronic device 100, and sends, to the server 400, the information indicating that the user determines to perform application permission synchronization and the information about the device group selected by the user for the electronic device 100. Finally, the electronic device 100 receives a permission authorization record of the first APP that is sent by the server 400, and configures the permission of the first APP on the electronic device 100 based on the permission authorization record.

Figure 11A:
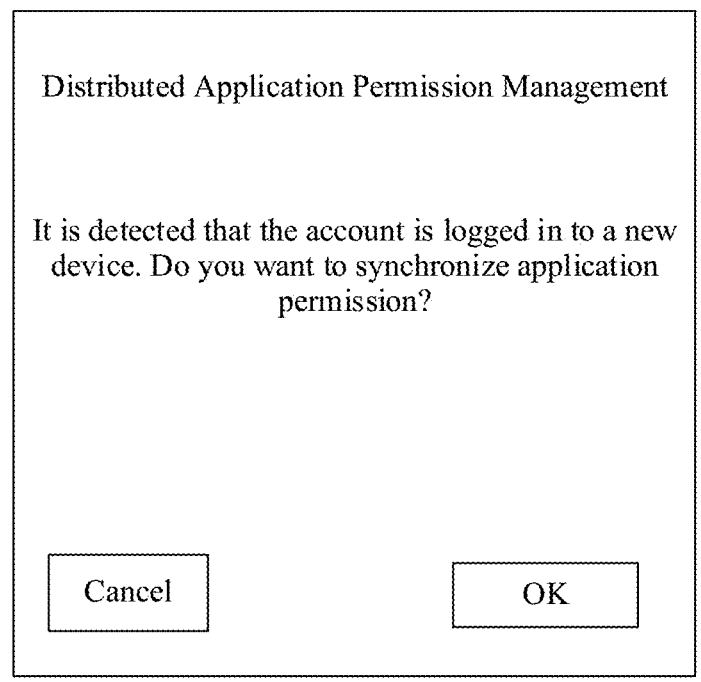
FIG. 11(*a*) is a schematic diagram of a first permission synchronization interface according to an embodiment of this application.
Figure 11B:
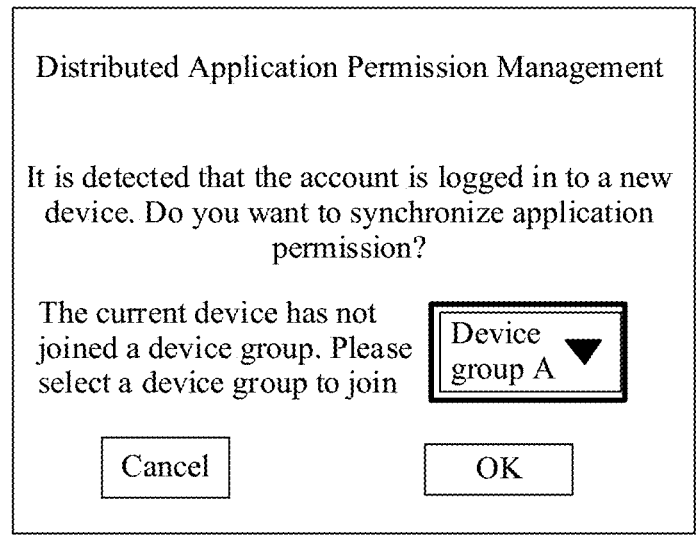

The first permission application interface may be as shown in FIG. 11(*a*). FIG. 11(*a*) is a schematic diagram of the first permission application synchronization interface according to an embodiment of this application. The interface shown in FIG. 11(*a*) includes information of "It is detected that the account is logged in to a new device. Do you want to synchronize application permission?". If the user taps an "OK" icon in the first permission application synchronization interface shown in FIG. 11(*a*), the electronic device 100 may obtain the information indicating that the user determines to perform application permission synchronization, and then the electronic device 100 sends, to the server 400, the information indicating that the user determines to perform application permission synchronization. Next, the electronic device 100 may receive a permission authorization record of the first APP sent by the server 400, and configure the permission of the first APP on the electronic device 100 based on the permission authorization record, so that after the user account is logged in to a new device, permission of an installed application under the user account can also be synchronized to the new device.

The second permission synchronization interface may be as shown in FIG. 11(*b*). FIG. 11(*b*) is a schematic diagram of the second permission synchronization interface according to an embodiment of this application. The interface shown in FIG. 11(*b*) includes information of "It is detected that the account is logged in to a new device. Do you want to synchronize application permission?", and information of "The current device has not joined a device group. Please select a device group to join". In other words, the second permission synchronization interface displayed by the electronic device 100 includes the information of selecting a device group for the electronic device 100 to join. The user may select, in a device group selection box shown in FIG. 11(*b*), a device group that the electronic device 100 needs to join, for example, a device group A.

After the user selects, for the electronic device 100, the device group to which the electronic device 100 needs to join, if the user taps an "OK" icon in the second permission synchronization interface shown in FIG. 11(*b*), the electronic device 100 may obtain the information indicating that the user determines to perform application permission synchronization and information about the device group selected by the user for the electronic device 100. Then, the electronic device 100 sends, to the server 400, the information indicating that the user determines to perform application permission synchronization and the information about the device group selected by the user for the electronic device 100. Next, the electronic device 100 may receive a permission authorization record of the first APP sent by the server 400, and configure the permission of the first APP on the electronic device 100 based on the permission authorization record, so that after the user account is logged in to a new device, permission of an installed application under the user account can also be synchronized to the new device.

In still another possible implementation of the embodiments shown in FIG. 5, FIG. 6, and FIG. 8 of this application, after the user account is logged in to the electronic device 100, the electronic device 100 may further obtain operation information of modifying permission configuration of the first APP by the user. Then, the electronic device 100 may obtain a distributed authorization mode of the user account from the server 400, display a permission modification interface to the user based on the distributed authorization mode of the user account, obtain permission configuration modified by the user on the permission modification interface, and send the modified permission configuration to the server 400.

Specifically, after the user account is logged in to the electronic device 100, the electronic device 100 first displays the account management interface shown in FIG. 9(*a*). After the user selects "Account and Security" in the interface shown in FIG. 9(*a*), the electronic device 100 may display an account permission management interface shown in FIG. 12(*a*). FIG. 12(*a*) is a schematic diagram of an account permission management interface according to another embodiment of this application. If the user selects "Application Permission Management" in the interface shown in FIG. 12(*a*), the electronic device 100 displays an application permission management interface shown in FIG. 12(*b*). FIG. 12(*b*) is a schematic diagram of an application permission management interface according to an embodiment of this application. If the user taps APP 1 in the interface shown in FIG. 12(*b*), the electronic device 100 displays a permission interface of APP 1 shown in FIG. 12(*c*). FIG. 12(*c*) is a schematic diagram of a permission interface of APP 1 according to an embodiment of this application.

Next, the user may select, in the interface shown in FIG. 12(*c*), permission of APP 1 that needs to be modified. Specifically, the user may select, in an operation manner such as tap, double-tap, or touch and hold, the permission of APP 1 that needs to be modified. Alternatively, the permission of APP 1 that needs to be modified may be selected by inputting a voice instruction. An operation manner in which the user selects the permission of APP 1 that needs to be modified is not limited in this embodiment. Refer to FIG. 12(*c*). The permission of APP 1 that needs to be modified and that is selected by the user in FIG. 12(*c*) is Permission 1. In this way, the electronic device 100 may obtain operation information of modifying Permission 1 of APP 1 by the user. The electronic device 100 obtains a distributed authorization mode of the user account from the server 400. When the distributed authorization mode of the user account is single-device authorization or all-device authorization, the electronic device 100 displays a permission modification interface shown in FIG. 12(*d*). When the distributed authorization mode of the user account is device group authorization, the electronic device 100 displays a permission modification interface shown in FIG. 12(e). FIG. 12(d) is a schematic diagram of a permission modification interface according to an embodiment of this application. FIG. 12(e) is a schematic diagram of a permission modification interface according to another embodiment of this application.

Figure 12A:
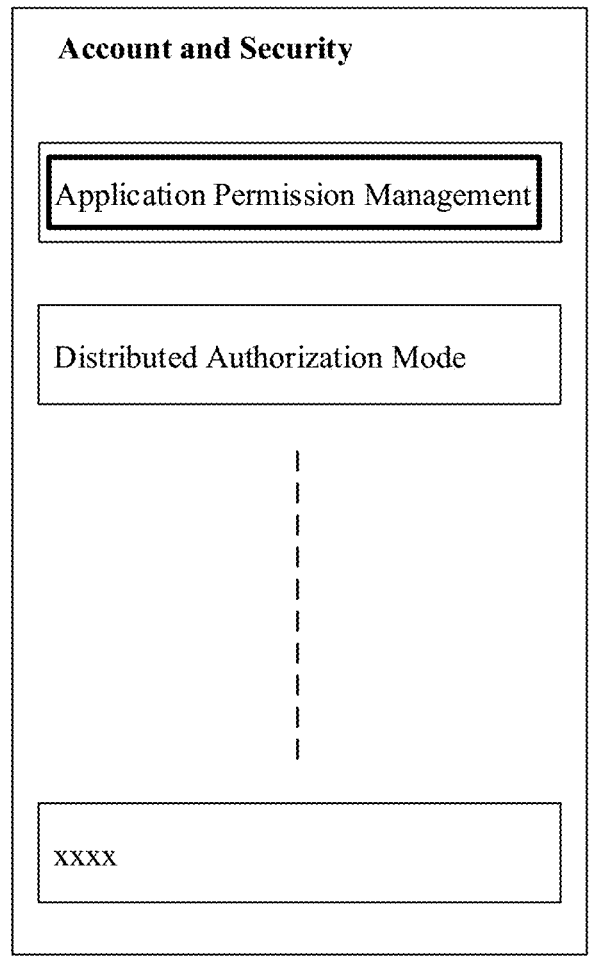
FIG. 12(*a*) is a schematic diagram of an account permission management interface according to another embodiment of this application.
Figure 12B:
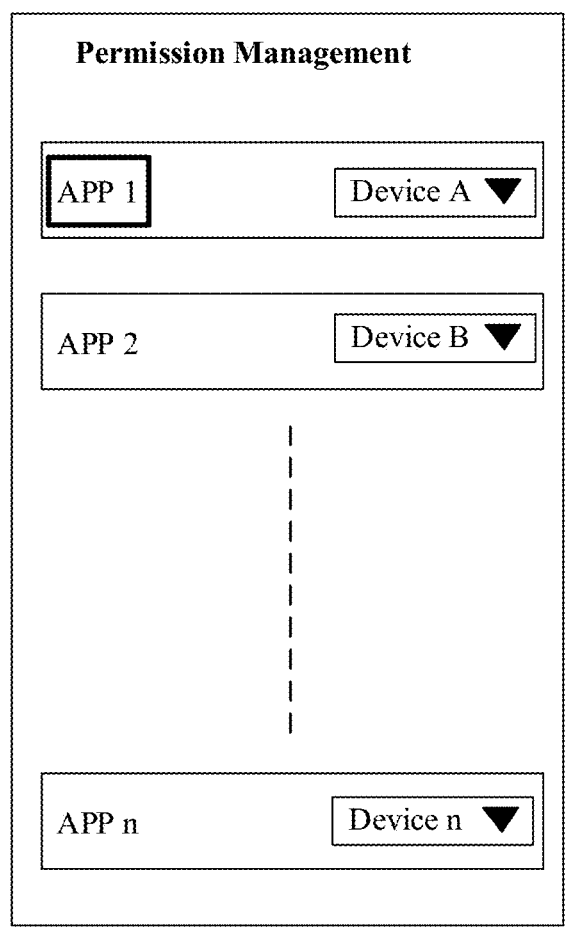
Figure 12C:
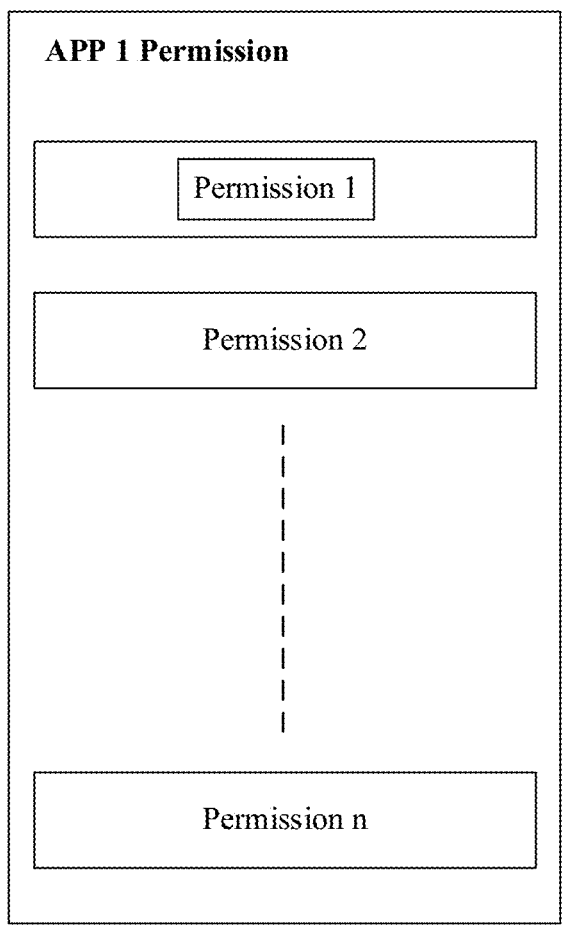
Figure 12D:
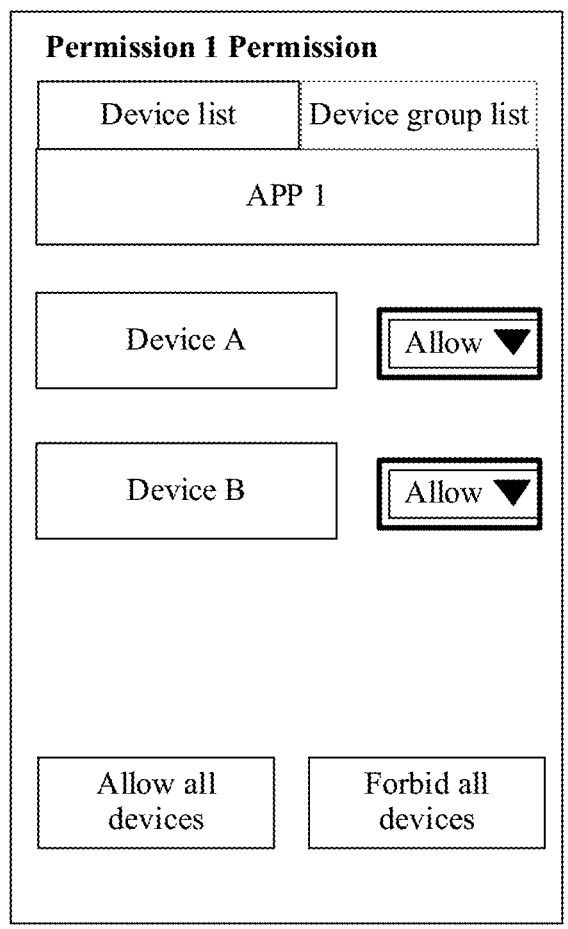
Figure 12E:
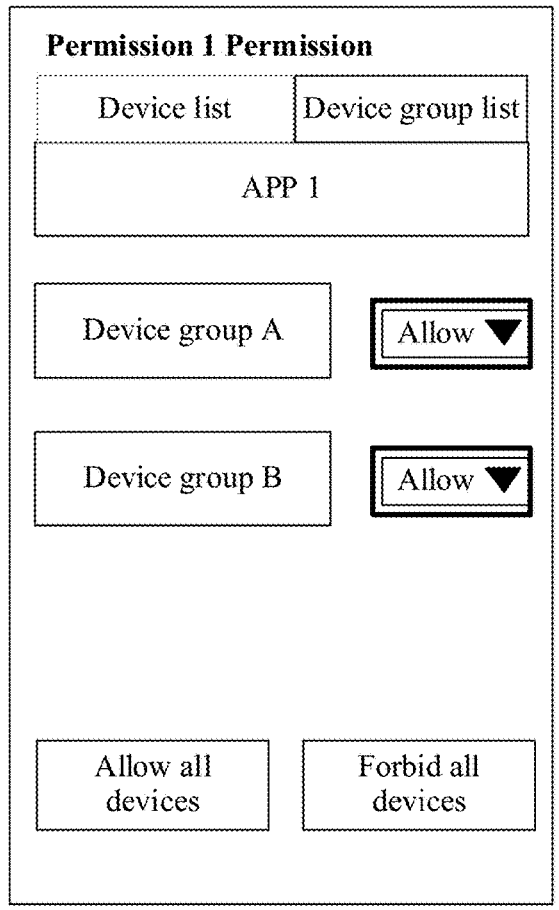

Finally, the electronic device 100 may obtain, from the permission modification interface shown in FIG. 12(d) or FIG. 12(e), permission configuration modified by the user in the permission modification interface, and send the modified permission configuration to the server 400.

It may be understood that in the foregoing several implementations, the electronic device 100 may implement an operation of displaying an interface by using the processor 110 and the display 194, and implement an operation of obtaining operation information or confirmation information of the user on an interface by using the processor 110 and the touch sensor 180K. In addition, the electronic device 100 may send and receive information to and from the server 400 by using the processor 110, the antenna 1, and the mobile communications module 150, and/or by using the processor 110, the antenna 2, and the wireless communications module 160.

In the description of the foregoing embodiments of this application, an example in which the user taps the "OK" icon in the interface is used for description of a confirmation form of the user. Certainly, this embodiment is not limited thereto, and the confirmation form of the user may also be set to biometric feature recognition, for example, fingerprint recognition or iris recognition, thereby improving reliability of permission setting.

In addition, in this embodiment of this application, the user may set different application permission for different device groups. For example, one device group may be set with sensitive permission, and another device group may be set with common permission. The sensitive permission and the common permission are separately set, so that security of application permission configuration can be improved.

Figure 13:
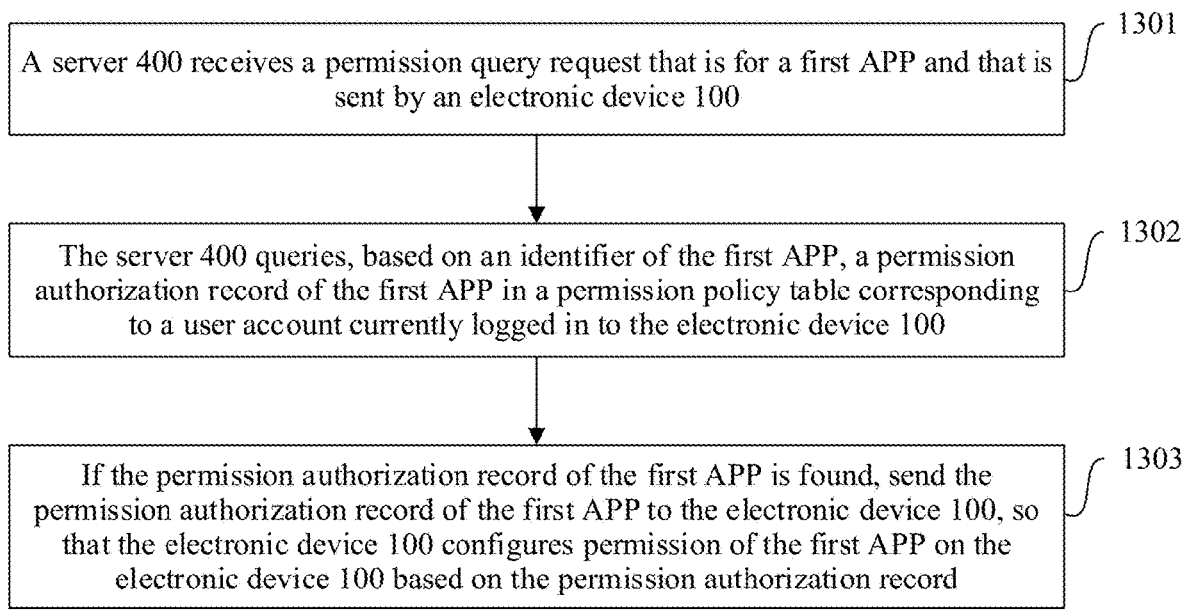
FIG. 13 is a flowchart of an application permission management method according to yet another embodiment of this application.

FIG. 13 is a flowchart of an application permission management method according to another embodiment of this application. As shown in FIG. 13, the application permission management method may include the following steps.

Step 1301: A server 400 receives a permission query request that is for a first APP and that is sent by an electronic device 100.

The permission query request is sent by the electronic device 100 after the electronic device 100 obtains operation information of starting the first APP by a user, and the permission query request carries an identifier of the first APP.

Step 1302: The server 400 queries, based on the identifier of the first APP, a permission authorization record of the first APP in a permission policy table corresponding to a user account currently logged in to the electronic device 100.

Step 1303: If the permission authorization record of the first APP is found, send the permission authorization record of the first APP to the electronic device 100, so that the electronic device 100 configures permission of the first APP on the electronic device 100 based on the permission authorization record.

In the foregoing application permission management method, after obtaining the operation information of starting the first APP by the user, the electronic device 100 sends the permission query request for the first APP to the server 400. If the server 400 finds the permission authorization record of the first APP in the permission policy table corresponding to the user account currently logged in to the electronic device 100, the permission authorization record of the first APP is sent to the electronic device 100, so that the electronic device 100 can configure permission of the first APP on the electronic device 100 based on the received permission authorization record. In this way, permission confirmation operations of installing a same application on different distributed devices for a plurality of times are simplified, and complex operations of popping up a dialog box for a user to confirm are reduced, thereby improving user experience.

Figure 14:
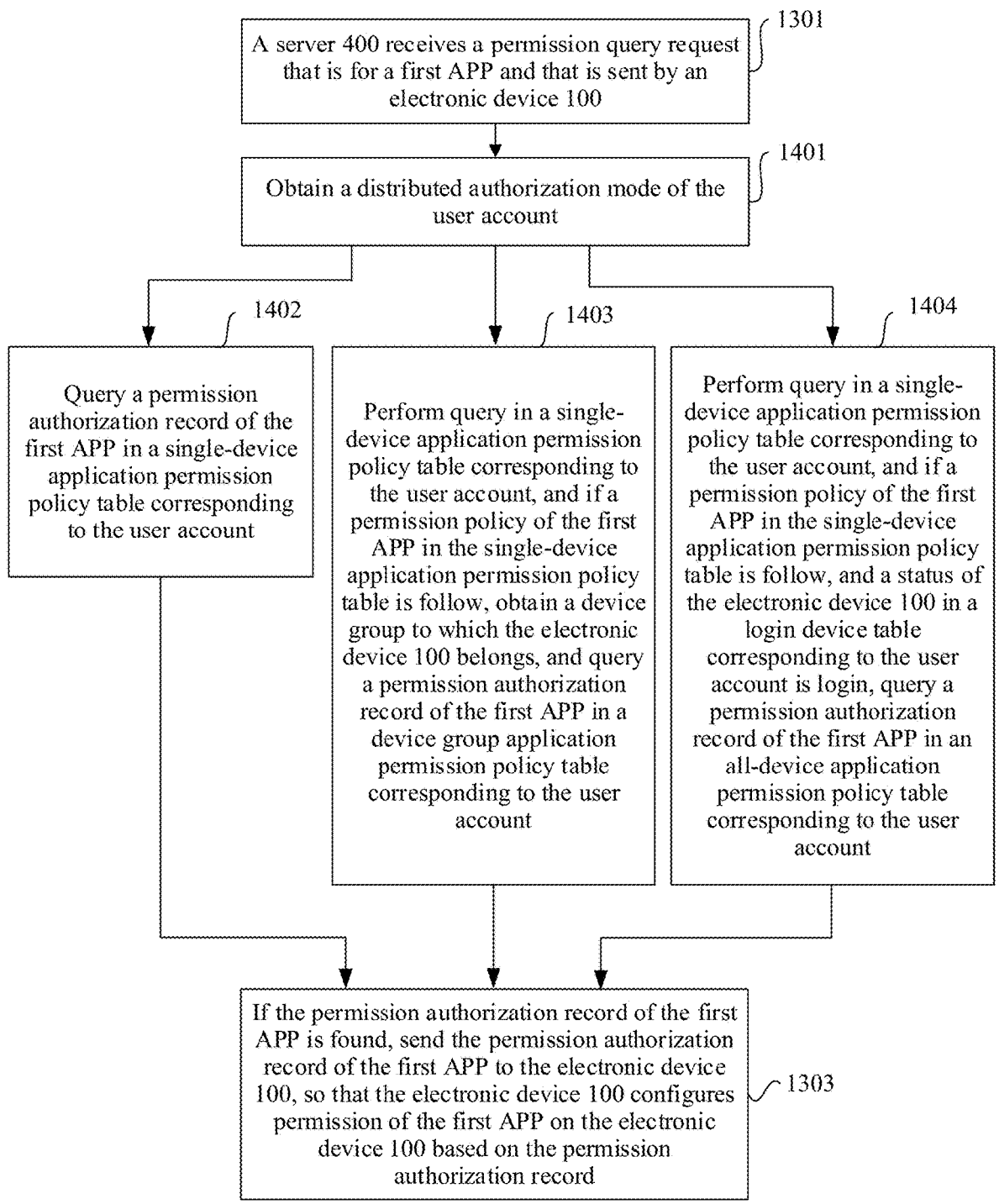
FIG. 14 is a flowchart of an application permission management method according to yet still another embodiment of this application.

FIG. 14 is a flowchart of an application permission management method according to another embodiment of this application. As shown in FIG. 14, in the embodiment shown in FIG. 13 of this application, step 1302 may include the following steps.

Step 1401: Obtain a distributed authorization mode of the user account.

In this embodiment, the server 400 provides a distributed authorization mode policy based on the user account. The distributed authorization mode is classified into single-device authorization, device group authorization, and all-device authorization. During specific implementation, one electronic device 100 may join one or more device groups. A quantity of device groups that the electronic device can join is not limited in this embodiment. However, in this embodiment, an example in which one electronic device 100 joins one device group is used for description.

Figure 15:
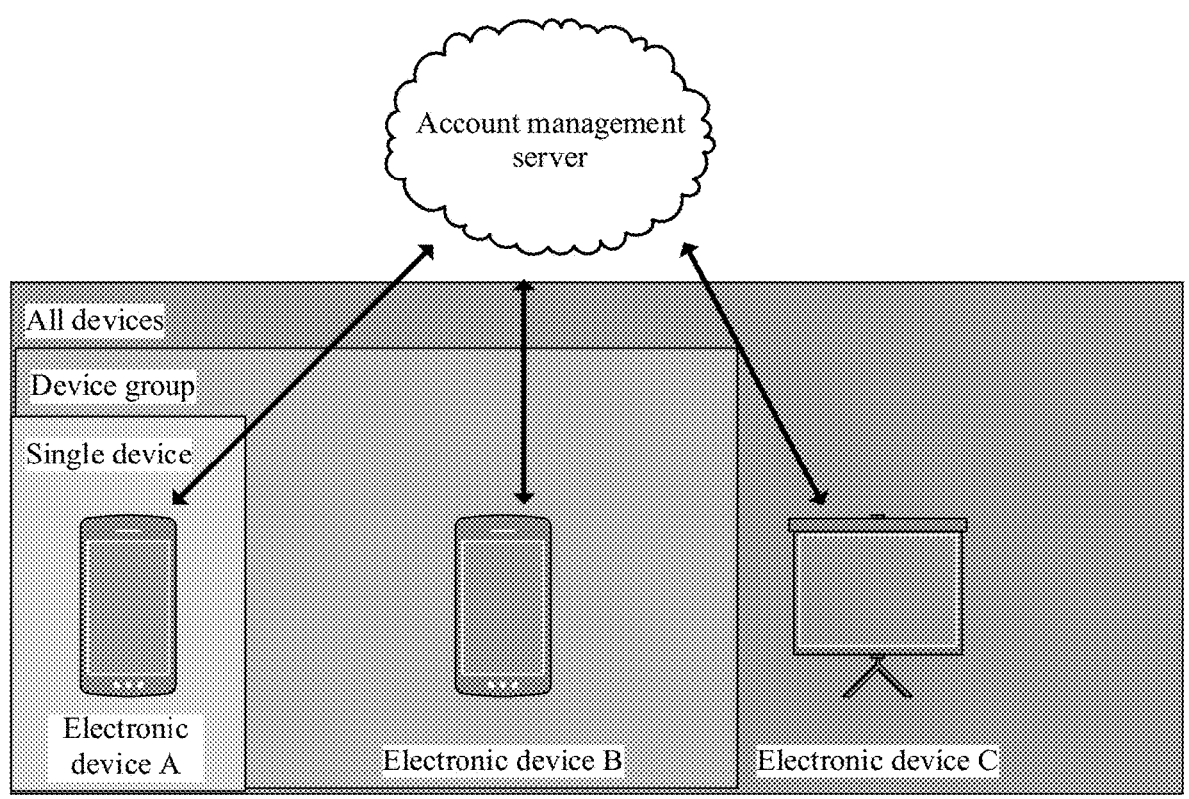
FIG. 15 is a schematic diagram of a distributed authorization mode according to an embodiment of this application.

For example, if the electronic device to which the user account is logged in includes electronic devices A, B, and C, the electronic devices A and B are in a same device group, and the user grants Permission 1 when starting APP 1 on the electronic device A for the first time, a schematic diagram of the distributed authorization mode may be shown in FIG. 15. FIG. 15 is a schematic diagram of a distributed authorization mode according to an embodiment of this application.

Refer to FIG. 15. In single-device authorization, Permission 1 is applied only to the electronic device A.

In device group authorization, Permission 1 is applied only to a device group (including the electronic device A and the electronic device B) to which the electronic device A belongs.

In all-device authorization, Permission 1 is applied to all electronic devices (including the electronic devices A, B, and C) to which the user account is logged in.

Specifically, after step 1401, if the distributed authorization mode of the user account is the single device authorization, step 1402 is performed; if the distributed authorization mode of the user account is the device group authorization, step 1403 is performed; or if the distributed authorization mode of the user account is the all-device authorization, step 1404 is performed.

Step 1402: Query the permission authorization record of the first APP in a single-device application permission policy table corresponding to the user account.

Step 1403: Perform query in the single-device application permission policy table corresponding to the user account, and if a permission policy of the first APP in the single-device application permission policy table is follow, a device group to which the electronic device 100 belongs is obtained, and a permission authorization record of the first APP is queried in a device group application permission policy table corresponding to the user account.

Step 1404: Perform query in the single-device application permission policy table corresponding to the user account. If the permission policy of the first APP in the single-device application permission policy table is follow, and a status of the electronic device 100 in a login device table corresponding to the user account is logged, the permission authorization record of the first APP is queried in an all-device application permission policy table corresponding to the user account.

During specific implementation, the server 400 may implement operations of step 1401 to step 1404 by using the processor 410.

The single-device application permission policy table records an application in the electronic device 100 and a corresponding permission policy. For example, the single-device application permission policy table may be shown in Table 1.

TABLE 1

| Application package name | Device identifier | Permission | Permission policy |
|---|---|---|---|
| com.xxx.APP 1 | Electronic device A | Permission 1 | grant/deny/query/follow |

The device group application permission policy table is used to record a device group and a corresponding permission policy. For example, the device group application permission policy table may be shown in Table 2.

TABLE 2

| Application package name | Device group number | Permission | Permission policy |
|---|---|---|---|
| com.xxx.APP 1 | Device group A | Permission 1 | grant/deny/query |

The all-device application permission policy table is used to record a permission policy corresponding to all devices. For example, the all-device application permission policy table may be shown in Table 3.

TABLE 3

| Application package name | Permission | Permission policy |
|---|---|---|
| com.xxx.APP 1 | Permission 1 | grant/deny/query |

In Table 1 to Table 3, meanings of valid values of the permission policy are as follows: grant: allow; deny: deny; query: query; follow: follow (that is, follow a current distributed authorization mode).

The login device table is used to record an electronic device to which the user account is logged in. For example, the login device table may be shown in Table 4.

TABLE 4

| Device identifier | Device alias | Status | Device description |
|---|---|---|---|
| Electronic device A | Device 1 | login | |
| Electronic device B | Device 2 | login | |
| Electronic device C | Device 3 | logout | |

In Table 4, a valid value of the status is login (login) or logout (logout).

Figure 16:
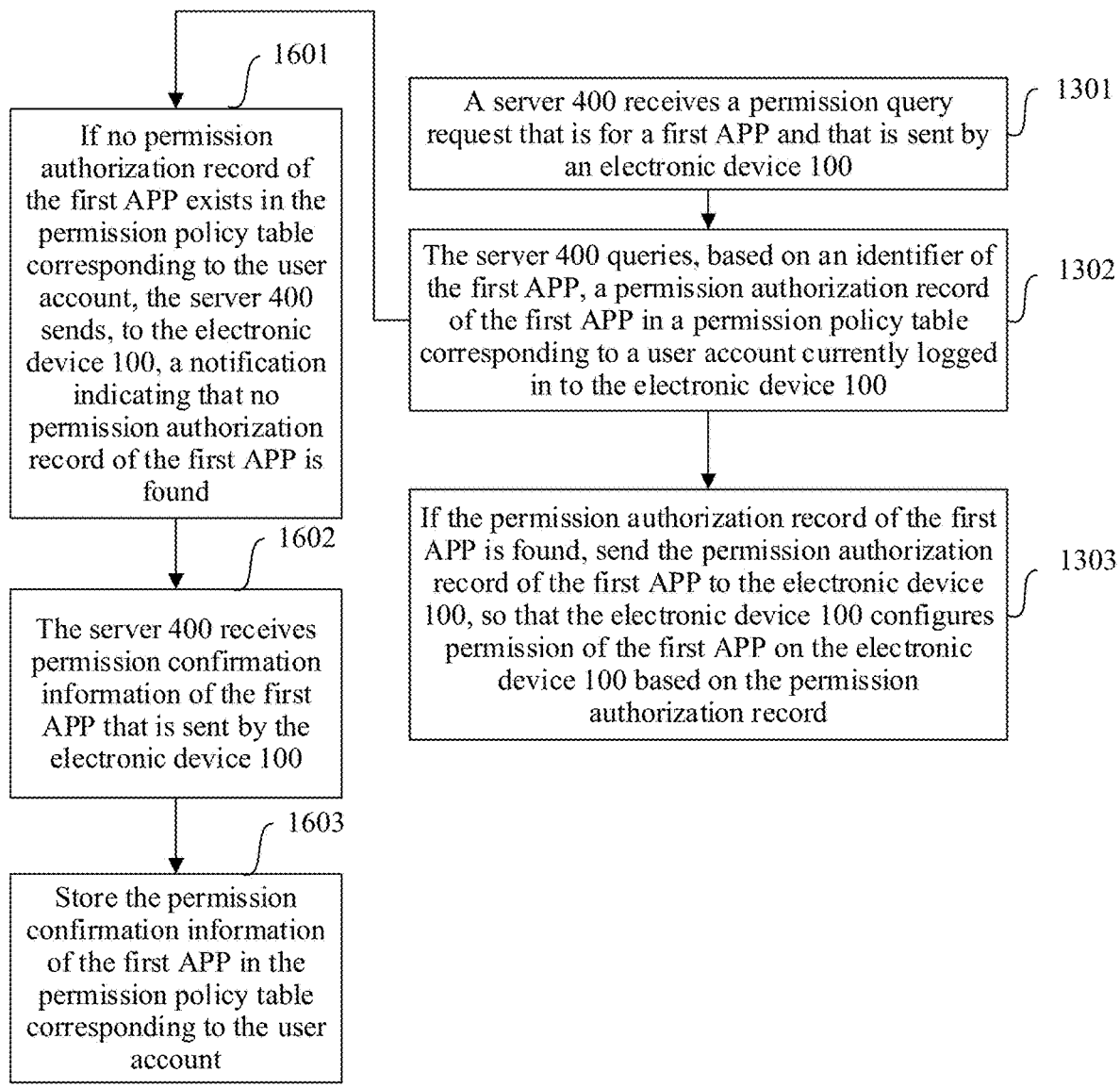
FIG. 16 is a flowchart of an application permission management method according to a further embodiment of this application.

FIG. 16 is a flowchart of an application permission management method according to another embodiment of this application. As shown in FIG. 16, in the embodiment shown in FIG. 13 of this application, after step 1302, the method may further include the following steps.

Step 1601: If no permission authorization record of the first APP exists in the permission policy table corresponding to the user account, the server 400 sends, to the electronic device 100, a notification indicating that no permission authorization record of the first APP is found.

Step 1602: The server 400 receives permission confirmation information that is of the first APP and that is sent by the electronic device 100.

Step 1603: The permission confirmation information of the first APP in the permission policy table corresponding to the user account.

Specifically, that the permission confirmation information of the first APP is stored in the permission policy table corresponding to the user account may be as follows: If the distributed authorization mode of the user account is single-device authorization, an entry of the electronic device 100 is added to the single-device application permission policy table corresponding to the user account, and a permission authorization record of the first APP is added to the added entry.

If the distributed authorization mode of the user account is device group authorization, and the electronic device 100 has joined a device group, a device group to which the electronic device 100 belongs is obtained, an entry of the electronic device 100 is added to the single-device application permission policy table corresponding to the user account, and in the added entry, the permission policy of the first APP is set to follow (follow). A permission authorization record of the first APP is added to an entry corresponding to the device group in the device group application permission policy table corresponding to the user account.

If the distributed authorization mode of the user account is all-device authorization, an electronic device to which the user account is logged in is obtained from the login device table corresponding to the user account. An entry of the electronic device to which the user account is logged in is added to the single-device application permission policy table corresponding to the user account. In the added entry, the permission policy of the first APP is set to follow, and a permission authorization record of the first APP is added to the all-device application permission policy table corresponding to the user account.

During specific implementation, the server 400 may implement operations of step 1601 and step 1603 by using the processor 410, and may implement an operation of step 1602 by using the processor 410 and the communications interface 420.

Figure 17:
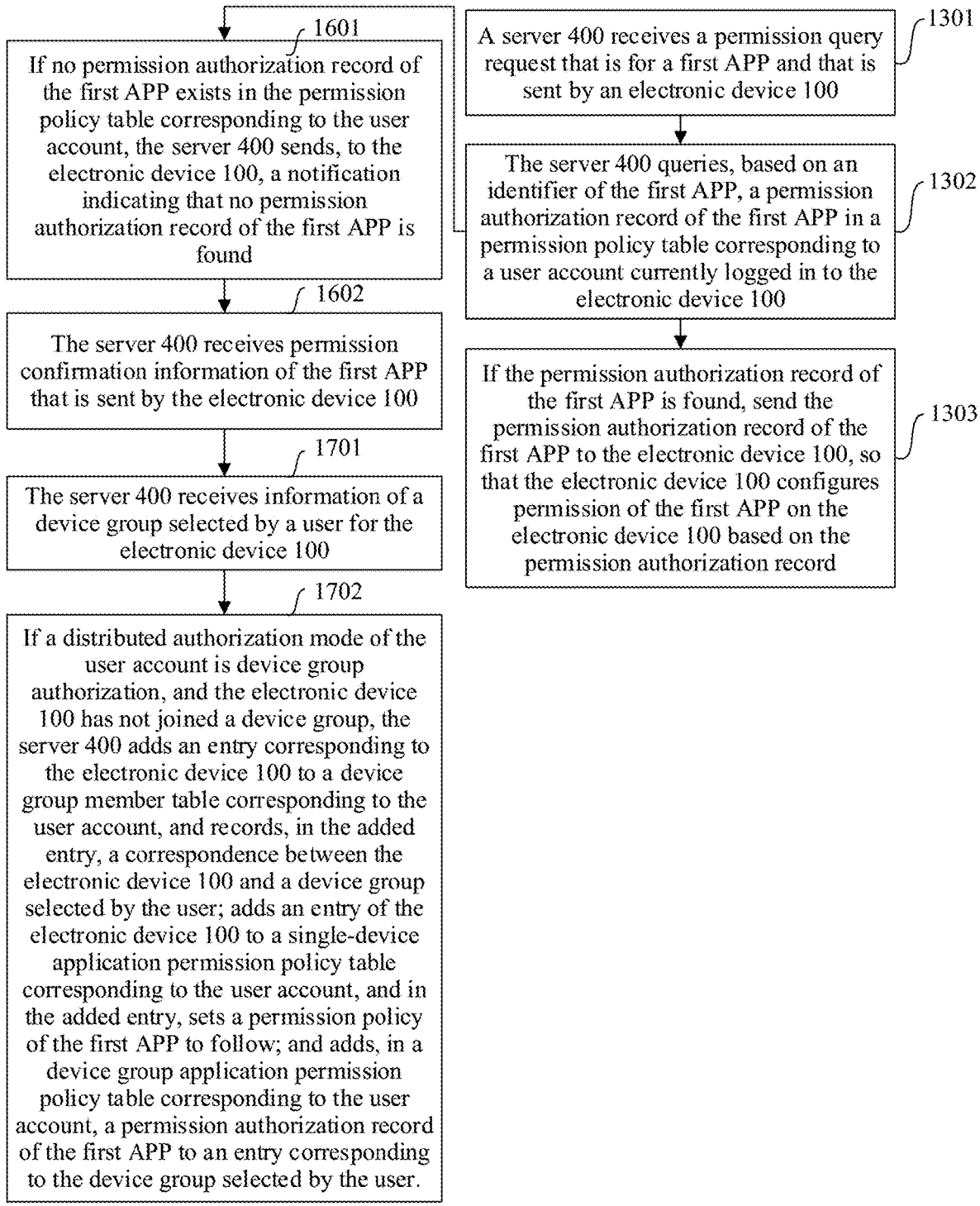
FIG. 17 is a flowchart of an application permission management method according to a further embodiment of this application.

FIG. 17 is a flowchart of an application permission management method according to another embodiment of this application. As shown in FIG. 17, in the embodiment shown in FIG. 16 of this application, after step 1601, the method may further include the following steps.

Step 1701: The server 400 receives information about a device group selected by the user for the electronic device 100.

In this case, step 1603 may be as follows:

Step 1702: If the distributed authorization mode of the user account is device group authorization, and the electronic device 100 has not joined a device group, the server 400 adds an entry corresponding to the electronic device 100 to a device group member table corresponding to the user account, and in the added entry, and records a correspondence between the electronic device 100 and a device group selected by the user. An entry of the electronic device 100 is added to the single-device application permission policy table corresponding to the user account, and in the added entry, the permission policy of the first APP is set to follow. In the device group application permission policy table corresponding to the user account, a permission authorization record of the first APP is added to an entry corresponding to the device group selected by the user.

In this embodiment, step 1701 and step 1602 may be performed concurrently or sequentially. An execution sequence of step 1701 and step 1602 is not limited in this embodiment. FIG. 17 shows an example in which step 1701 is performed after step 1602.

The device group member table is used to record electronic devices included in the device group. For example, the device group member table may be shown in Table 5.

TABLE 5

| Device group number | Device identifier |
|---|---|
| Device group A | Electronic device A |
| Device group A | Electronic device B |
| Device group B | Electronic device C |

During specific implementation, the server 400 may implement an operation of step 1702 by using the processor 410, and may implement an operation of step 1701 by using the processor 410 and the communications interface 420.

Figure 18:
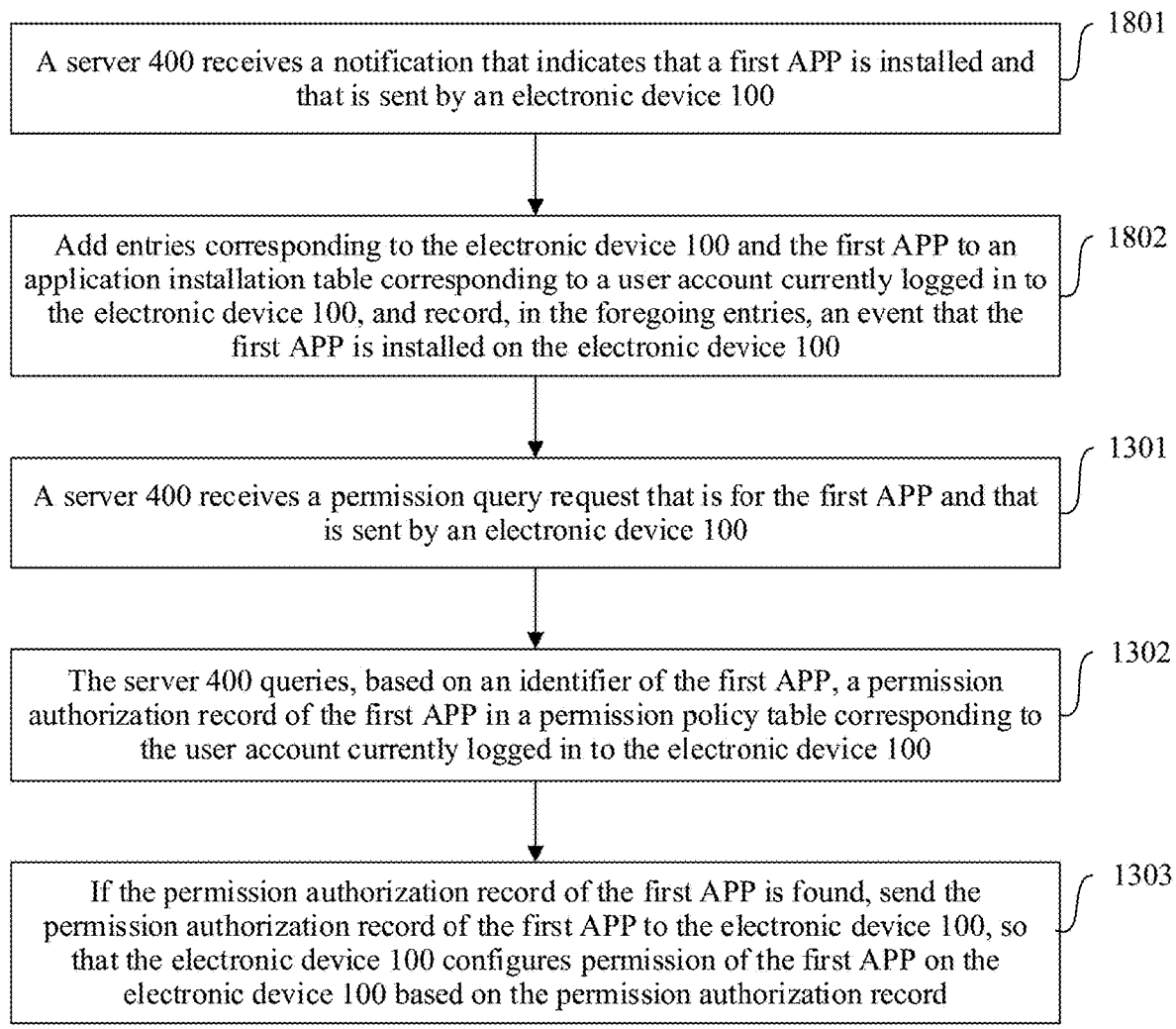
FIG. 18 is a flowchart of an application permission management method according to a further embodiment of this application.

FIG. 18 is a flowchart of an application permission management method according to another embodiment of this application. As shown in FIG. 18, in the embodiment shown in FIG. 13 of this application, before step 1301, the method may further include the following steps.

Step 1801: The server 400 receives a notification that indicates that the first APP is installed and that is sent by the electronic device 100.

Step 1802: Entries corresponding to the electronic device 100 and the first APP are added to an application installation table corresponding to a user account currently logged in to the electronic device 100, and an event that the first APP is installed on the electronic device 100 is recorded in the foregoing entries.

The application installation table is used to record an application that has been installed on the electronic device 100. For example, the application installation table may be shown in Table 6.

TABLE 6

| Application package name | Device identifier |
|---|---|
| com.xxx.APP 1 | Electronic device A |

It can be learned from Table 6 that APP 1 is installed on the electronic device A.

Further, in this embodiment, the server 400 may further receive a notification that indicates that the first APP is uninstalled and that is sent by the electronic device 100. The entries corresponding to the electronic device 100 and the first APP are deleted from the application installation table corresponding to the user account. If the application installation table corresponding to the user account shows that the first APP is not installed on the electronic device, an entry corresponding to the first APP is deleted from the permission policy table corresponding to the user account. The permission policy table corresponding to the user account includes the single-device application permission policy table, the device group application permission policy table, and the all-device application permission policy table.

Table 6 is still used as an example. After APP 1 is uninstalled from the electronic device A, the electronic device A sends a notification indicating that APP 1 is uninstalled to the server 400, and then the server 400 deletes, from Table 6, entries corresponding to the electronic device A and APP 1. After the entries are deleted, the application installation table may be shown in Table 7.

TABLE 7

| Application package name | Device identifier |
|---|---|
| com.xxx.APP 1 | Electronic device A |

It can be learned from Table 7 that APP 1 is not installed on the electronic device. In this case, the server 400 deletes, from the permission policy table corresponding to the user account, the entry corresponding to the first APP. The permission policy table corresponding to the user account includes the single-device application permission policy table, the device group application permission policy table, and the all-device application permission policy table. The single-device application permission policy table, the device group application permission policy table, and the all-device application permission policy table after the entries are deleted are respectively shown in Table 8, Table 9, and Table 10.

TABLE 8

| Application package name | Device identifier | Permission | Permission policy |
|---|---|---|---|
| com.xxx.APP 1 | Device A | Permission 1 | follow |

TABLE 9

| Application package name | Device group number | Permission | Permission policy |
|---|---|---|---|
| com.xxx.APP 1 | Device group A | Permission 1 | grant |

TABLE 10

| Application package name | Permission | Permission policy |
|---|---|---|
| com.xxx.APP 1 | Permission 1 | grant |

During specific implementation, the server 400 may implement an operation of step 1801 by using the processor 410, and may implement an operation of step 1802 by using the processor 410 and the communications interface 420.

In the embodiments shown in FIG. 13 to FIG. 18 of this application, in a possible implementation, the server 400 may further receive a distributed authorization mode sent by the electronic device 100. The distributed authorization mode is a distributed authorization mode selected by the user and obtained after the user account is logged in to the electronic device 100 for the first time. The distributed authorization mode includes single-device authorization, device group authorization, and all-device authorization. Then, the server 400 records the distributed authorization mode in a distributed application authorization mode table corresponding to the user account.

The distributed application authorization mode table is used to record a current distributed authorization mode. For example, the distributed application authorization mode table may be shown in Table 11.

TABLE 11

Distributed authorization mode

Single-device authorization, device group authorization, or all-device authorization In another possible implementation, the server 400 may further obtain an event that the user account is successfully logged in to another electronic device other than the electronic device 100, and notify the another electronic device to display a permission synchronization interface to a user who uses the another electronic device. Then, the server 400 receives information that is sent by the another electronic device and that indicates that the user who uses the another electronic device confirms application permission synchronization, and sends a permission authorization record of the first APP to the another electronic device. An entry corresponding to the another electronic device is added to the login device table corresponding to the user account, and an event that the user account is logged in to the another electronic device is recorded in the added entry.

Then, after notifying the another electronic device to display the permission synchronization interface to the user who uses the another electronic device, the server further receives information that is sent by the another electronic device and that is of the device group selected by the user for the another electronic device, and sends the permission authorization record of the first APP to the another electronic device. An entry corresponding to the another electronic device is added to the login device table corresponding to the user account, and an event that the user account is logged in to the another electronic device is recorded in the added entry. In addition, an entry corresponding to the another electronic device is added to the device group member table corresponding to the user account, and in the added entry, a correspondence between the another electronic device and the device group to which the another electronic device belongs is recorded.

In yet another possible implementation, after the electronic device 100 starts the first APP, the server 400 obtains an event that the user account is logged out from the electronic device 100, and updates, in the login device table corresponding to the user account, the status of the electronic device 100 to logout.

For example, Table 4 is used as an example. Assuming that the electronic device 100 is the electronic device A in Table 4, after obtaining the event that the user account is logged out from the electronic device A, the server 400 may update the status of the electronic device A to logout (logout) in the login device table corresponding to the user account. In this case, the login device table may be shown in Table 12.

TABLE 12

| Device identifier | Device alias | Status | Device description |
| --- | --- | --- | --- |
| Electronic device A | Device 1 | logout | |
| Electronic device B | Device 2 | login | |
| Electronic device C | Device 3 | logout | |

Further, after updating, in the login device table corresponding to the user account, the status of the electronic device 100 to logout, the server 400 may further obtain an event that the user account is re-logged in to the electronic device 100, and notify the electronic device 100 to display the permission application interface to the user. The permission application interface displays information about whether to use the application permission corresponding to the user account. Then, the server 400 receives information that is sent by the electronic device 100 and that indicates that the user determines to use the application permission corresponding to the user account, and updates the status of the electronic device to login in the login device table corresponding to the user account.

The permission application interface may be shown in FIG. 10.

Table 12 is still used as an example. Assuming that the electronic device 100 is the electronic device A, after the server 400 obtains the event that the user account is re-logged in to the electronic device 100, the server 400 may update the state of the electronic device A to login (login) in the login device table corresponding to the user account. In this case, the login device table may be shown in Table 13.

TABLE 13

| Device identifier | Device alias | Status | Device description |
| --- | --- | --- | --- |
| Electronic device A | Device 1 | login | |
| Electronic device B | Device 2 | login | |
| Electronic device C | Device 3 | logout | |

According to the application permission management method provided in this embodiment of this application, permission confirmation operations for installing a same application on different distributed devices for a plurality of times are simplified, and a distributed device permission management method based on a user account is provided, so that single-point or batch permission operation management can be performed, thereby reducing complex operations of popping up a dialog box for a user to confirm, and improving user experience.

In addition, the method provided in this embodiment of this application may be not only used for permission configuration of an APP, but also may be applied to notification management of the APP. Specifically, after obtaining operation information of notification management performed on the first APP, the electronic device 100 may send a notification management query request for the first APP to the server 400. The notification management query request includes an identifier of the first APP. Then, the electronic device 100 may receive notification management configuration information of the first APP that is sent by the server 400, and configure notification management of the first APP on the electronic device 100 based on the notification management configuration information.

Figure 19A:
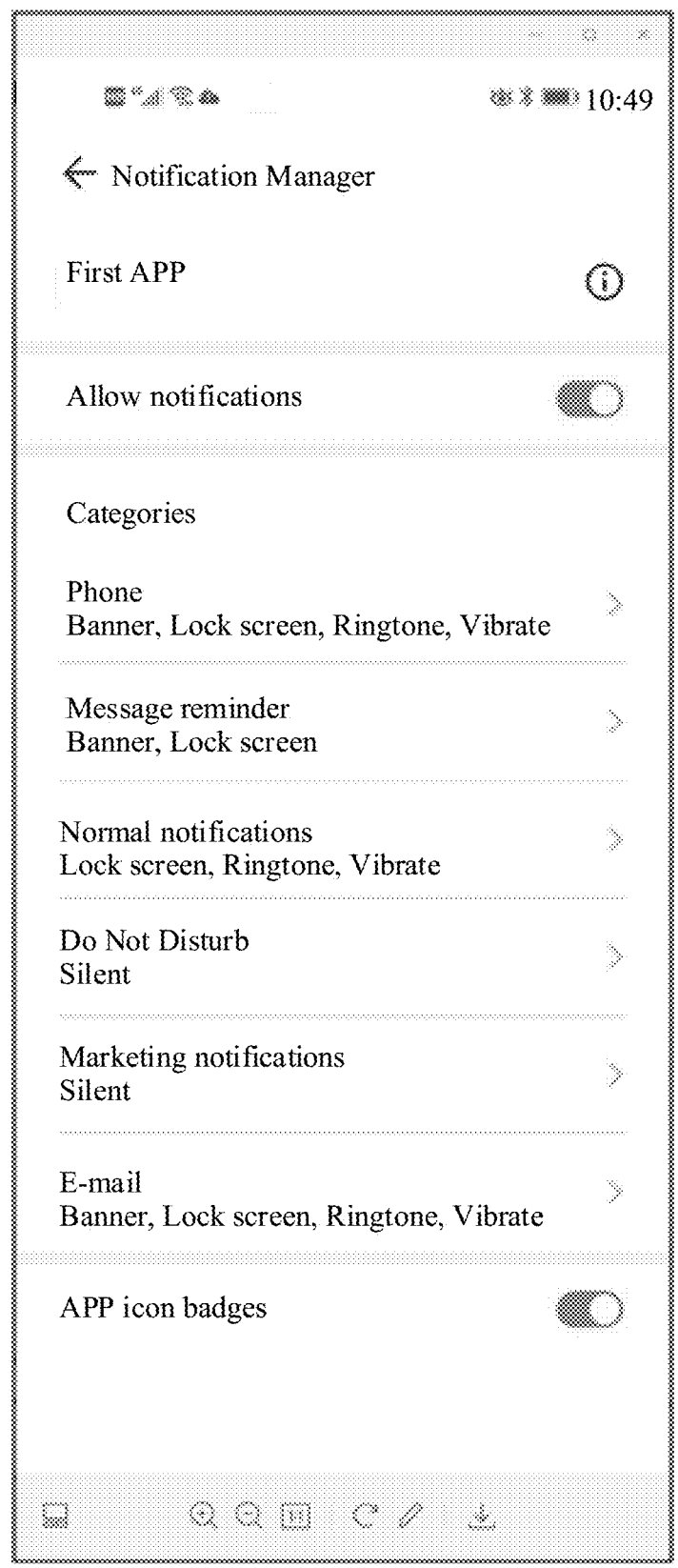
FIG. 19(*a*) and FIG. 19(*b*) are schematic diagrams of a notification management interface of a first APP according to an embodiment of this application.
Figure 19B:
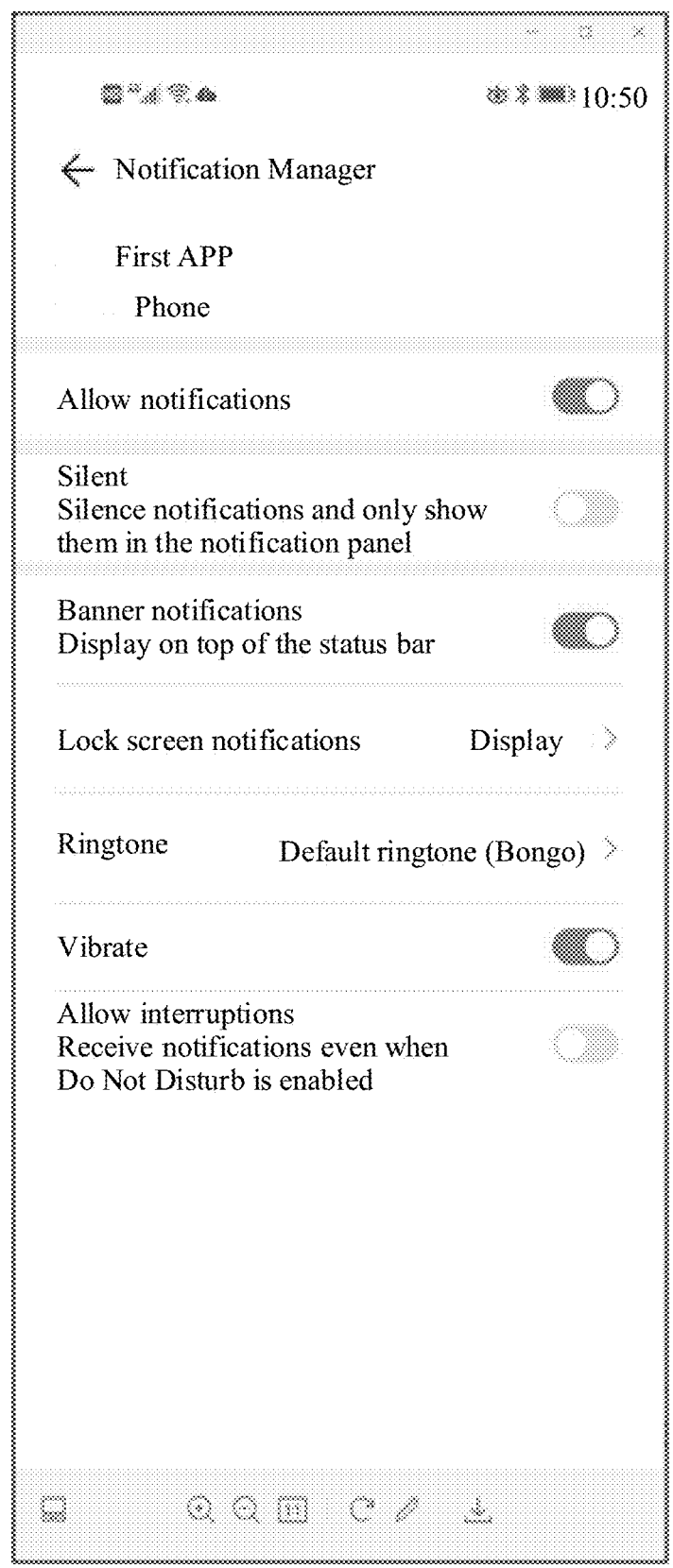

In this embodiment, after the electronic device 100 configures the notification management of the first APP, a notification management interface of the first APP may be shown in FIG. 19(*a*) and FIG. 19(*b*). FIG. 19(*a*) and FIG. 19(*b*) are schematic diagrams of the notification management interface of the first APP according to an embodiment of this application. FIG. 19(*a*) shows various notification options of the first APP, including "Phone", "Chat Message Reminder", "Common Notification", "Do Not Disturb Mode", "Marketing Notification", "Email", and "Desktop Icon Badge". Further, referring to FIG. 19(*b*), for "Phone", there are specific notification setting options, for example, "Silent Notification", "Banner Notification", "Lock Screen Notification", "Ringtone", "Vibration", and "Allow Disturbance".

According to the method provided in this embodiment of this application, after the electronic device 100 obtains the operation information of the notification management performed on the first APP by the user, the electronic device 100 may query the notification management configuration information of the first APP from the server 400. Further, the electronic device 100 may configure notification management of the first APP on the electronic device 100 based on the received configuration information. In this way, when a same application is installed on different distributed devices, a user does not need to repeatedly perform a notification management configuration operation on a same application on different devices. In this way, a configuration operation of notification management in which a same application is installed on different distributed devices for a plurality of times is simplified, and user experience is improved.

It may be understood that some or all of the steps or operations in the foregoing embodiments are merely examples. Other operations or variations of various operations may be performed in embodiments of this application. In addition, the steps may be performed in a sequence different from that presented in the foregoing embodiments, and not all operations in the foregoing embodiments may need to be performed.

It may be understood that, to implement the foregoing functions, the electronic device includes corresponding hardware and/or software modules for performing the functions. Algorithm steps in the examples described with reference to embodiments disclosed in this application can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application with reference to embodiments, but it should not be considered that the implementation goes beyond the scope of this application.

In this embodiment, the electronic device may be divided into function modules according to the foregoing method embodiments. For example, each function module may be obtained through division based on each corresponding function, or two or more functions may be integrated into one module. The integrated module may be implemented in a form of hardware. It should be noted that, in embodiments, division into modules is an example and is merely logical function division. During actual implementation, there may be another division manner.

Figure 20:
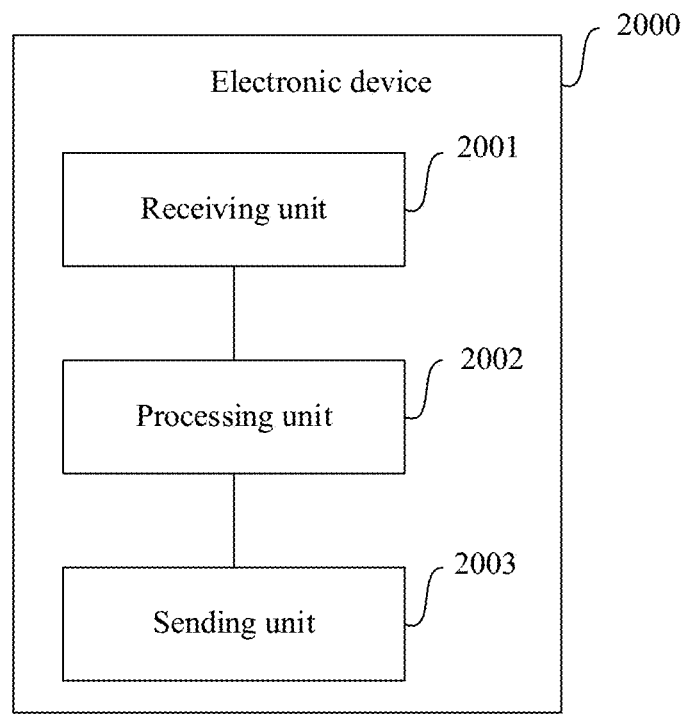
FIG. 20 is a schematic diagram of a structure of an electronic device according to another embodiment of this application.

FIG. 20 is a schematic diagram of a structure of an electronic device according to another embodiment of this application. When each function module is obtained through division based on each corresponding function, FIG. 20 is a schematic diagram of a possible composition of an electronic device 2000 in the foregoing embodiment, and as shown in FIG. 20, the electronic device 2000 may include: a receiving unit 2001, a processing unit 2002, and a sending unit 2003.

The receiving unit 2001 may be configured to support the electronic device 2000 in performing step 503, step 601, step 801, and the like, and/or may be used in another process of the technical solutions described in embodiments of this application.

The processing unit 2002 may be configured to support the electronic device 2000 in performing step 501, step 504, step 602, step 603, and the like, and/or may be used in another process of the technical solutions described in embodiments of this application.

The sending unit 2003 may be configured to support the electronic device 2000 in performing step 502, step 801, and the like, and/or may be used in another process of the technical solutions described in embodiments of this application.

It should be noted that all related content of the steps in the foregoing method embodiments may be cited in function description of corresponding functional modules. Details are not described herein again.

The electronic device 2000 provided in this embodiment is configured to perform the foregoing application permission management method, and therefore can achieve a same effect as the foregoing method.

It should be understood that the electronic device 2000 may correspond to the electronic device 100 shown in FIG. 1. Functions of the receiving unit 2001 and the sending unit 2003 may be implemented by the processor 110, the antenna 1, and the mobile communications module 190 in the electronic device 100 shown in FIG. 1, and/or may be implemented by the processor 110, the antenna 2, and the wireless communications module 160. A function of the processing unit 2002 may be implemented by the processor 110, the touch sensor 180K, and the display 194 in the electronic device 100 shown in FIG. 1.

When an integrated unit is used, the electronic device 2000 may include a processing module, a storage module, and a communications module.

The processing module may be configured to control and manage an action of the electronic device 2000, for example, may be configured to support the electronic device 2000 in performing the steps performed by the receiving unit 2001, the processing unit 2002, and the sending unit 2003. The storage module may be configured to support the electronic device 2000 in storing program code, data, and the like. The communications module may be configured to support communications between the electronic device 2000 and another device.

The processing module may be a processor or a controller, and may implement or execute various example logic blocks, modules, and circuits described with reference to content disclosed in this application. The processor may alternatively be a combination of processors implementing a computing function, for example, a combination of one or more microprocessors or a combination of a digital signal processor (digital signal processor, DSP) and a microprocessor. The storage module may be a memory. The communications module may be specifically a device, for example, a radio frequency circuit, a Bluetooth chip, and/or a Wi-Fi chip, that interacts with another electronic device.

In an embodiment, when the processing module is a processor and the storage module is a memory, the electronic device 2000 in this embodiment may be a device having the structure shown in FIG. 1.

Similarly, it may be understood that, to implement the foregoing functions, the server includes corresponding hardware and/or software modules for performing the functions. Algorithm steps in the examples described with reference to embodiments disclosed in this application can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application with reference to embodiments, but it should not be considered that the implementation goes beyond the scope of this application.

In this embodiment, the server may be divided into function modules according to the foregoing method embodiments. For example, each function module may be obtained through division based on each corresponding function, or two or more functions may be integrated into one module. The integrated module may be implemented in a form of hardware. It should be noted that, in embodiments, division into modules is an example and is merely logical function division. During actual implementation, there may be another division manner.

Figure 21:
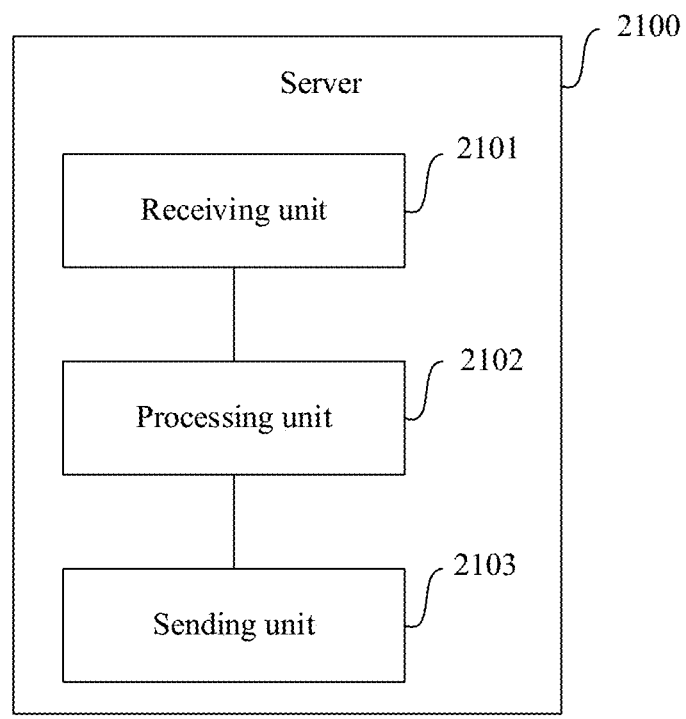
FIG. 21 is a schematic diagram of a structure of a server according to another embodiment of this application.

FIG. 21 is a schematic diagram of a structure of a server according to another embodiment of this application. When each function module is obtained through division based on each corresponding function, FIG. 21 is a schematic diagram of a possible composition of a server 2100 in the foregoing embodiment, and as shown in FIG. 21, the server 2100 may include: a receiving unit 2101, a processing unit 2102, and a sending unit 2103.

The receiving unit 2101 may be configured to support the server 2100 in performing step 1301, step 1602, step 1701, step 1801, and the like, and/or may be used in another process of the technical solutions described in embodiments of this application.

The processing unit 2102 may be configured to support the server 2100 in performing step 1302, step 1401 to step 1404, step 1603, step 1702, step 1802, and the like, and/or may be used in another process of the technical solutions described in embodiments of this application.

The sending unit 2103 may be configured to support the server 2100 in performing step 1303, step 1601, and the like, and/or may be used in another process of the technical solutions described in embodiments of this application.

It should be noted that all related content of the steps in the foregoing method embodiments may be cited in function description of corresponding functional modules. Details are not described herein again.

The server 2100 provided in this embodiment is configured to perform the foregoing application permission management method, and therefore can achieve a same effect as the foregoing method.

It should be understood that the server 2100 may correspond to the server 400 shown in FIG. 4. Functions of the receiving unit 2101 and the sending unit 2103 may be implemented by the processor 410 and the communications interface 420 in the server 400 shown in FIG. 4. A function of the processing unit 2102 may be implemented by the processor 410 in the server 400 shown in FIG. 4.

When an integrated unit is used, the server 2100 may include a processing module, a storage module, and a communications module.

The processing module may be configured to control and manage an action of the server 2100, for example, may be configured to support the server 2100 in performing the steps performed by the receiving unit 2101, the processing unit 2102, and the sending unit 2103. The storage module may be configured to support the server 2100 in storing program code, data, and the like. The communications module may be configured to support communications between the server 2100 and another device.

The processing module may be a processor or a controller, and may implement or execute various example logic blocks, modules, and circuits described with reference to content disclosed in this application. The processor may alternatively be a combination of processors implementing a computing function, for example, a combination of one or more microprocessors or a combination of a digital signal processor (digital signal processor, DSP) and a microprocessor. The storage module may be a memory. The communications module may be specifically a device, for example, a radio frequency circuit, a Bluetooth chip, and/or a Wi-Fi chip, that interacts with another electronic device.

In an embodiment, when the processing module is a processor, and the storage module is a memory, the server 2100 in this embodiment may be a device having the structure shown in FIG. 4.

An embodiment of this application further provides a computer-readable storage medium. The computer-readable storage medium stores a computer program. When the computer program is run on a computer, the computer is enabled to perform the method provided in the embodiments shown in FIG. 5 to FIG. 12(*e*) in this application.

An embodiment of this application further provides a computer program product. The computer program product includes a computer program. When the computer program is run on a computer, the computer is enabled to perform the method provided in the embodiments shown in FIG. 5 to FIG. 12(*e*) in this application.

An embodiment of this application further provides a computer-readable storage medium. The computer-readable storage medium stores a computer program. When the computer program is run on a computer, the computer is enabled to perform the method provided in the embodiments shown in FIG. 13 to FIG. 18 in this application.

An embodiment of this application further provides a computer program product. The computer program product includes a computer program. When the computer program is run on a computer, the computer is enabled to perform the method provided in the embodiments shown in FIG. 13 to FIG. 18 in this application.

In embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. "At least one of the following items" and a similar expression refer to any combination of these items, including a single item or any combination of a plurality of items. For example, at least one of a, b, and c may indicate a, b, c, a and b, a and c, b and c, or a, b, and c, where a, b, and c may be singular or plural.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In embodiments of this application, when any of the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. An application permission management method, comprising:
    logging into, by a user, an electronic device for a first time;
    obtaining a permission authorization mode selected by the user logging into the electronic device, based on the user logging into the electronic device for the first time, wherein the authorization modes comprise at least single device authorization, device group authorization, and all-device authorization;
    obtaining, by the electronic device, based on a distributed authorization mode being selected by the user, operation information of starting, by the user, a first application installed in the electronic device;
    sending a permission query request for the first application to a server, wherein the permission query request comprises an identifier of the first application;
    receiving a permission authorization record of the first application sent by the server; and
    configuring permission of the first application on the electronic device based on the permission authorization record.

2. The method according to claim 1, wherein the method further comprises, after the sending a permission query request for the first application to a server:
    receiving a notification sent by the server, wherein the notification indicates that no permission authorization record of the first application is found;
    obtaining a distributed authorization mode of a user account logged in to the electronic device; and
    displaying a permission confirmation interface to the user based on the distributed authorization mode.

3. The method according to claim 2, wherein the displaying the permission confirmation interface to the user based on the distributed authorization mode comprises:
    displaying, based on the distributed authorization mode being single-device authorization or full-device authorization, or based on the distributed authorization mode being device group authorization and the electronic device has joined a device group, a first permission confirmation interface to the user; or
    displaying, based on the distributed authorization mode being device group authorization and the electronic device has not joined a device group, a second permission confirmation interface to the user, wherein the second permission confirmation interface comprises information of selecting a device group for the electronic device to join.

4. The method according to claim 3, wherein the method further comprises, after the displaying a first permission confirmation interface to the user:
    obtaining permission confirmation information of the first application from the first permission confirmation interface;
    sending the permission confirmation information of the first application to the server; and
    configuring the permission of the first application on the electronic device based on the permission confirmation information of the first application.

5. The method according to claim 3, wherein the method further comprises, after the displaying a second permission confirmation interface to the user:
    obtaining, from the second permission confirmation interface, permission confirmation information of the first application and information about a device group selected by the user for the electronic device;
    sending, to the server, the permission confirmation information of the first application and the information about the device group selected by the user for the electronic device; and
    configuring the permission of the first application on the electronic device based on the permission confirmation information of the first application.

6. The method according to claim 1, wherein the method further comprises, before the obtaining operation information of starting, by the user, the first application installed in the electronic device:
    sending, to the server, after the first application is installed on the electronic device, a notification indicating that the first application is installed.

7. The method according to claim 6, further comprising:
    sending, to the server, after the first application is uninstalled on the electronic device, a notification indicating that the first application is uninstalled.

8. The method according to claim 1, further comprising:
    displaying an account permission management interface to the user after a user account is logged in to the electronic device for the first time;
    obtaining a permission authorization mode selected by the user on the account permission management interface;
    displaying, based on the permission authorization mode selected by the user being distributed authorization, a distributed authorization mode interface to the user, wherein the distributed authorization mode interface displays distributed authorization modes;
    obtaining a distributed authorization mode selected by the user; and
    sending the distributed authorization mode selected by the user to the server.

9. The method according to claim 1, further comprising:
    receiving, after a user account is logged out from the electronic device, and after the user account is re-logged in, a notification sent by the server indicating to display a permission application interface to the user;
    displaying the permission application interface to the user, wherein the permission application interface comprises information about whether to use an application permission corresponding to the user account;
    obtaining information indicating that the user determines to use the application permission corresponding to the user account; and sending, to the server, the information indicating that the user determines to use the application permission corresponding to the user account.

10. The method according to claim 1, further comprising:
receiving, after a user account is logged in to the electronic device, a notification sent by the server indicating to display a permission synchronization interface;
obtaining a distributed authorization mode of the user account logged in to the electronic device;
displaying, based on the distributed authorization mode of the user account being all-device authorization, or based on the distributed authorization mode being device group authorization and the electronic device has joined a device group, a first permission synchronization interface to the user;
displaying, in the first permission synchronization interface, information about whether to synchronize application permission;
obtaining information indicating that the user determines to perform application permission synchronization;
sending, to the server, the information indicating that the user determines to perform application permission synchronization;
receiving the permission authorization record of the first application sent by the server; and
configuring permission of the first application on the electronic device based on the permission authorization record.

11. The method according to claim 10, wherein the method further comprises, after the obtaining the distributed authorization mode of the user account logged in to the electronic device:
displaying, based on the distributed authorization mode of the user account being device group authorization, and the electronic device has not joined a device group, a second permission synchronization interface to the user, wherein the second permission synchronization interface comprises information about whether to synchronize application permission and information of selecting a device group for the electronic device to join;
obtaining information indicating that the user determines to perform application permission synchronization and information about a device group selected by the user for the electronic device;
sending, to the server, the information indicating that the user determines to perform application permission synchronization and the information about the device group selected by the user for the electronic device;
receiving the permission authorization record of the first application sent by the server; and
configuring the permission of the first application on the electronic device based on the permission authorization record.

12. The method according to claim 1, further comprising:
obtaining, after a user account is logged in to the electronic device, operation information of modifying permission configuration of the first application by the user;
obtaining a distributed authorization mode of the user account from the server;
displaying a permission modification interface to the user based on the distributed authorization mode of the user account;
obtaining the permission configuration modified by the user on the permission modification interface; and
sending the modified permission configuration to the server.

13. An electronic device, comprising:
one or more processors;
a non-transitory computer-readable storage medium storing a plurality of applications and one or more programs to be executed by the one or more processors, the one or more programs including instructions for:
logging into, by a user, the electronic device for a first time;
obtaining a permission authorization mode selected by the user logging into the electronic device, based on the user logging into the electronic device for the first time, wherein the authorization modes comprise at least single device authorization, device group authorization, and all-device authorization;
obtaining operation information of starting, by the user, based on a distributed authorization mode being selected by the user, a first application of the plurality of applications installed in the electronic device;
sending a permission query request for the first application to a server, wherein the permission query request comprises an identifier of the first application;
receiving a permission authorization record of the first application sent by the server; and
configuring permission of the first application on the electronic device based on the permission authorization record.

14. The electronic device according to claim 13, wherein the instructions further include instructions for, after performing the step of sending a permission query request for the first application to a server:
receiving a notification sent by the server and that indicates that no permission authorization record of the first application is found;
obtaining a distributed authorization mode of a user account logged in to the electronic device; and
displaying a permission confirmation interface to the user based on the distributed authorization mode.

15. The electronic device according to claim 14, wherein the instructions for displaying the permission confirmation interface to the user based on the distributed authorization mode comprise instructions for:
displaying, based on the distributed authorization mode being single-device authorization or full-device authorization, or based on the distributed authorization mode being device group authorization and the electronic device has joined a device group, a first permission confirmation interface to the user; or
displaying, based on the distributed authorization mode being device group authorization and the electronic device has not joined a device group, a second permission confirmation interface to the user, wherein the second permission confirmation interface comprises information of selecting a device group for the electronic device to join.

16. The electronic device according to claim 15, wherein the instructions further include instructions for, after displaying the first permission confirmation interface to the user:
obtaining permission confirmation information of the first application from the first permission confirmation interface;
sending the permission confirmation information of the first application to the server; and configuring the permission of the first application on the electronic device based on the permission confirmation information of the first application.

17. The electronic device according to claim 15, wherein the instructions further include instructions for, after displaying the second permission confirmation interface to the user:
- obtaining, based on the second permission confirmation interface, permission confirmation information of the first application and information about a device group selected by the user for the electronic device;
- sending, to the server, the permission confirmation information of the first application and the information about the device group selected by the user for the electronic device; and
- configuring the permission of the first application on the electronic device based on the permission confirmation information of the first application.

18. The electronic device according to claim 13, wherein the instructions further include instructions for, before obtaining operation information of starting, by the user, the first application installed in the electronic device:
- sending, to the server, after the first application is installed on the electronic device, a notification indicating that the first application is installed.

19. The electronic device according to claim 18, wherein the instructions further include instructions for:
- sending, to the server, after the first application is uninstalled on the electronic device, a notification indicating that the first application is uninstalled.

20. A non-transitory computer-readable storage medium storing a program to be executed by a processor, the program including instructions for:
- logging into, by a user, an electronic device for a first time;
- obtaining a permission authorization mode selected by the user logging into the electronic device, based on the user logging into the electronic device for the first time, wherein the authorization modes comprise at least single device authorization, device group authorization, and all-device authorization;
- obtaining, by the electronic device, based on a distributed authorization mode being selected by the user, operation information of starting, by the user, a first application installed in the electronic device;
- sending a permission query request for the first application to a server, wherein the permission query request comprises an identifier of the first application;
- receiving a permission authorization record of the first application sent by the server; and
- configuring permission of the first application on the electronic device based on the permission authorization record.

* * * * *